US010823214B2

(12) United States Patent
Davis et al.

(10) Patent No.: US 10,823,214 B2
(45) Date of Patent: Nov. 3, 2020

(54) MODULAR FURNITURE WITH DISTRIBUTED PRESSURE PANEL JOINT

(71) Applicants: Clark Evan Davis, Provo, UT (US); Paul Schmidt, Provo, UT (US)

(72) Inventors: Clark Evan Davis, Provo, UT (US); Paul Schmidt, Provo, UT (US)

(73) Assignee: Clark Evan Davis, Genola, UT (US)

(*) Notice: Subject to any disclaimer, the term of this patent is extended or adjusted under 35 U.S.C. 154(b) by 475 days.

(21) Appl. No.: 15/793,724

(22) Filed: Oct. 25, 2017

(65) Prior Publication Data

US 2018/0112696 A1    Apr. 26, 2018

Related U.S. Application Data

(60) Provisional application No. 62/413,110, filed on Oct. 26, 2016.

(51) Int. Cl.
*F16B 12/46*    (2006.01)
*A63H 33/10*    (2006.01)
*A47B 47/04*    (2006.01)

(52) U.S. Cl.
CPC ............ *F16B 12/46* (2013.01); *A47B 47/042* (2013.01); *A63H 33/105* (2013.01)

(58) Field of Classification Search
CPC ...... F16B 5/0032; F16B 5/0012; F16B 12/20; F16B 12/22; F16B 12/44; F16B 12/10; F16B 12/125; F16B 12/46; A47B 47/0075; A47B 47/0091; A47B 47/0066; A47B 47/0042; A47B 47/042; A47C 4/021

See application file for complete search history.

(56) References Cited

U.S. PATENT DOCUMENTS

| 919,257 | A | 4/1909 | Seydewitz |
| 981,532 | A | 1/1911 | Cary |
| 1,061,297 | A | 5/1913 | Johnson |
| 1,419,647 | A | 6/1922 | Shepherdson |
| 1,431,823 | A | 10/1922 | Georges |
| 1,747,900 | A | 2/1930 | Jenny |
| 1,903,631 | A | 4/1933 | Morrison |
| 1,940,117 | A | 12/1933 | Carpos |
| 1,981,646 | A | 11/1934 | Hamley |
| 2,240,256 | A | 4/1941 | Elmendorf |
| 2,279,864 | A | 4/1942 | Eide |

(Continued)

FOREIGN PATENT DOCUMENTS

| CA | 1255355 | 6/1989 |
| CH | 281702 | 3/1952 |

(Continued)

OTHER PUBLICATIONS

Celery Rocking Chair viewed at http://www.eroomservice.com/manufacturer/celery/ circa Dec. 3, 2011.

(Continued)

*Primary Examiner* — Daniel J Wiley
(74) *Attorney, Agent, or Firm* — Pate Peterson PLLC; Brett Peterson

(57) ABSTRACT

A joint for modular furniture includes a first panel joined to a second panel with a slot and a tab. The slot and tab are formed with complementary faces which are angled to prevent delamination of anisotropic materials such as plywood.

24 Claims, 21 Drawing Sheets

(56) References Cited

U.S. PATENT DOCUMENTS

| | | | |
|---|---|---|---|
| 2,334,912 A | 11/1943 | Eide | |
| 2,369,930 A | 2/1945 | Wagner | |
| D144,730 S | 5/1946 | Perrault | |
| 2,418,731 A | 4/1947 | Seitz | |
| 2,479,086 A | 8/1949 | Silverman | |
| 2,481,671 A | 9/1949 | John et al. | |
| 2,486,987 A | 11/1949 | Scarlett | |
| 2,518,955 A | 8/1950 | Stelzer | |
| 2,534,413 A | 12/1950 | Cenis | |
| 2,551,071 A | 5/1951 | Tyncs | |
| D164,552 S | 9/1951 | Curtis | |
| 2,595,002 A | 4/1952 | Schneider | |
| 2,602,012 A | 7/1952 | Doty | |
| 2,615,771 A | 10/1952 | Curtis | |
| 2,632,498 A | 3/1953 | Curtis | |
| 2,672,181 A | 3/1954 | Rose | |
| 2,677,491 A | 5/1954 | Burger | |
| 2,703,724 A | 3/1955 | Der Yuen | |
| 2,720,253 A | 10/1955 | Turner | |
| 2,745,591 A | 5/1956 | Holt | |
| 2,786,789 A | 3/1957 | Carlson | |
| 2,792,877 A | 5/1957 | West | |
| 2,801,895 A * | 8/1957 | Gass | F16B 12/00 312/257.1 |
| 2,825,101 A | 3/1958 | Rubsnstein | |
| 3,053,598 A | 9/1962 | Cheslow | |
| 3,089,675 A | 5/1963 | Lozier | |
| 3,149,880 A | 9/1964 | Steuer | |
| 3,186,027 A | 6/1965 | Merillat | |
| 3,262,405 A | 7/1966 | Sutton | |
| 3,300,170 A | 1/1967 | Charles | |
| 3,300,245 A | 1/1967 | Rumble | |
| D212,601 S | 11/1968 | Rubsnstein | |
| 3,527,497 A | 9/1970 | Self | |
| 3,547,491 A | 12/1970 | Bovasso | |
| 3,578,385 A | 5/1971 | Stiglitz | |
| 3,603,274 A | 9/1971 | Ferdinand | |
| 3,603,656 A | 9/1971 | Ferman | |
| 3,636,893 A | 1/1972 | Lange | |
| 3,674,328 A * | 7/1972 | White et al. | A47B 47/042 312/263 |
| 3,684,285 A | 8/1972 | Kane | |
| 3,697,363 A | 10/1972 | Martinez | |
| 3,783,801 A | 1/1974 | Engman | |
| 3,788,700 A | 1/1974 | Wartes | |
| 3,812,977 A | 5/1974 | Glassman | |
| 3,831,533 A | 8/1974 | Kellogg | |
| 3,847,435 A | 11/1974 | Skinner | |
| 4,021,128 A | 5/1977 | Chiames | |
| 4,055,924 A | 11/1977 | Beaver | |
| D247,596 S | 3/1978 | Osamu | |
| 4,082,356 A | 4/1978 | Johnson | |
| 4,099,472 A | 7/1978 | Kellogg | |
| 4,103,818 A | 8/1978 | Raubenheimer | |
| 4,140,065 A | 2/1979 | Chacon | |
| 4,153,311 A | 5/1979 | Takhasaki | |
| 4,158,277 A | 6/1979 | Krempp et al. | |
| 4,188,067 A | 2/1980 | Elmer | |
| 4,191,113 A | 3/1980 | Hogberg | |
| 4,202,581 A | 5/1980 | Fleishman | |
| 4,225,180 A | 9/1980 | Gillis | |
| 4,258,464 A * | 3/1981 | Ullman, Jr. | A47B 57/22 144/220 |
| 4,348,052 A | 9/1982 | Roland | |
| 4,390,204 A | 6/1983 | Fleishman | |
| 4,419,028 A | 12/1983 | Roland | |
| 4,433,753 A | 2/1984 | Watson | |
| 4,433,843 A | 2/1984 | Bricco | |
| 4,492,332 A | 1/1985 | Collins | |
| 4,501,512 A | 2/1985 | Hiltz | |
| 4,509,794 A | 4/1985 | Roland | |
| 4,533,174 A | 8/1985 | Fleishman | |
| 4,544,092 A | 10/1985 | Palmer | |
| 4,548,350 A | 10/1985 | Engle | |
| 4,574,917 A | 3/1986 | Stoddard | |
| 4,591,090 A | 5/1986 | Collins | |
| 4,593,950 A | 6/1986 | Vittorio | |
| 4,595,105 A | 6/1986 | Gold | |
| D289,234 S | 4/1987 | Hoult | |
| 4,685,609 A | 8/1987 | Ferrari | |
| 4,706,573 A | 11/1987 | Sielaff | |
| 4,712,837 A | 12/1987 | Swilley | |
| 4,759,449 A | 7/1988 | Gold | |
| D299,087 S | 12/1988 | Bruce | |
| 4,841,878 A | 6/1989 | Kriegsman | |
| D302,216 S | 7/1989 | Roland | |
| 4,846,530 A | 7/1989 | Noble | |
| 4,867,327 A | 9/1989 | Roland | |
| 4,878,439 A | 11/1989 | Samson | |
| 4,884,420 A | 12/1989 | Finkel | |
| 4,926,759 A | 5/1990 | Vitsky et al. | |
| 4,934,765 A * | 6/1990 | Slifer, Sr. | A47B 88/941 312/258 |
| 5,011,228 A | 4/1991 | Marcantel | |
| 5,069,144 A | 12/1991 | Williford | |
| 5,082,329 A | 1/1992 | Mars | |
| 5,253,594 A | 10/1993 | Sideris | |
| 5,253,595 A | 10/1993 | Heidmann | |
| 5,263,766 A | 11/1993 | McCullough | |
| 5,275,467 A | 1/1994 | Kawecki | |
| 5,343,816 A | 9/1994 | Sideris | |
| 5,354,589 A | 10/1994 | Waas | |
| 5,367,964 A | 11/1994 | Hockensmith | |
| 5,387,027 A | 2/1995 | Maloney | |
| 5,454,331 A | 10/1995 | Green | |
| 5,605,378 A | 2/1997 | Oyediran | |
| 5,613,449 A | 3/1997 | Pullman | |
| 5,644,995 A | 7/1997 | Gurwell et al. | |
| 5,655,812 A | 8/1997 | Albecker | |
| 5,706,741 A | 1/1998 | Thorp | |
| 5,720,537 A * | 2/1998 | Lutz | A47B 87/0246 312/111 |
| 5,752,611 A | 5/1998 | Nakagawa | |
| 5,765,922 A | 6/1998 | Hsia | |
| 5,803,548 A | 9/1998 | Battle | |
| 5,803,561 A * | 9/1998 | Puehlhorn | F16B 12/125 312/263 |
| 5,881,653 A | 3/1999 | Pfister | |
| 5,901,521 A * | 5/1999 | Guy | E04B 2/08 52/564 |
| 5,921,631 A | 7/1999 | Bush | |
| 5,927,816 A | 7/1999 | Hsu | |
| 5,941,377 A | 8/1999 | Hart | |
| 5,992,938 A | 11/1999 | Jones | |
| 6,029,584 A | 2/2000 | Cochrane | |
| 6,036,270 A | 3/2000 | Bufalini | |
| 6,041,920 A | 3/2000 | Hart | |
| D422,799 S | 4/2000 | Dworshak et al. | |
| 6,053,585 A | 4/2000 | Osen | |
| 6,109,695 A | 8/2000 | Kahwaji | |
| 6,126,022 A | 10/2000 | Merkel | |
| 6,155,641 A | 12/2000 | Frost | |
| 6,174,116 B1 | 1/2001 | Brand | |
| 6,189,974 B1 | 2/2001 | Beck | |
| 6,247,754 B1 | 6/2001 | Vanderaue et al. | |
| 6,283,564 B1 | 9/2001 | Corson | |
| 6,347,772 B1 | 2/2002 | L'Hotel | |
| 6,378,707 B1 | 4/2002 | Taggert | |
| 6,443,076 B1 | 9/2002 | Case | |
| 6,532,878 B2 | 3/2003 | Tidemann | |
| 6,595,378 B2 | 7/2003 | Wang | |
| 6,615,746 B2 | 9/2003 | Bart | |
| 6,615,999 B1 | 9/2003 | Culp | |
| 6,619,749 B2 | 9/2003 | Willy | |
| 6,675,979 B2 | 1/2004 | Taylor | |
| 6,769,369 B1 | 8/2004 | Brandenberg | |
| 6,807,912 B2 | 10/2004 | Willy | |
| D499,577 S | 12/2004 | Willy | |
| 6,845,871 B1 | 1/2005 | Culp | |
| 6,848,747 B1 | 2/2005 | Robinson | |
| 6,895,870 B1 | 5/2005 | Bizlewicz | |
| 6,955,401 B1 | 10/2005 | Shoulberg | |
| 7,066,548 B2 | 6/2006 | Butler | |
| 7,114,300 B1 | 10/2006 | Culp | |

(56) References Cited

U.S. PATENT DOCUMENTS

| | | | |
|---|---|---|---|
| 7,168,766 B2 | 1/2007 | Pelletier | |
| 7,219,962 B2 | 5/2007 | Stone | |
| D547,076 S | 7/2007 | Hughes et al. | |
| 7,255,403 B2 | 8/2007 | Butler | |
| 7,300,110 B1 | 11/2007 | Debien | |
| 7,386,960 B2 | 6/2008 | Molteni | |
| 7,533,940 B1 | 5/2009 | Zook | |
| 7,631,605 B2 | 12/2009 | Willy | |
| 7,765,942 B2 | 8/2010 | Choi | |
| 7,856,772 B1 | 12/2010 | Culp et al. | |
| 8,123,311 B2 | 2/2012 | Nilsson | |
| 8,167,377 B2 | 5/2012 | Kovach | |
| 8,215,245 B2 | 7/2012 | Morrison | |
| 8,220,399 B2 | 7/2012 | Berent et al. | |
| 8,332,917 B2 | 12/2012 | Forster et al. | |
| 8,459,476 B2 | 6/2013 | Malekmadani | |
| 8,590,976 B2 | 11/2013 | Davis | |
| 9,277,814 B2 | 3/2016 | Winker | |
| 9,282,819 B2 | 3/2016 | Blake | |
| 9,447,804 B2 * | 9/2016 | Andersson | F16B 12/125 |
| 9,534,623 B2 | 1/2017 | Anderson et al. | |
| 9,615,663 B2 | 4/2017 | Davis | |
| 9,706,836 B1 | 7/2017 | Nelson | |
| 10,138,917 B2 * | 11/2018 | Koch | F16B 5/0052 |
| 10,227,162 B2 | 3/2019 | Davis et al. | |
| 2003/0107255 A1 | 6/2003 | Willy | |
| 2004/0056526 A1 | 3/2004 | Willy | |
| 2004/0227041 A1 | 11/2004 | Lewis | |
| 2007/0187348 A1 | 8/2007 | Malekmadani | |
| 2008/0074013 A1 | 3/2008 | Ahlgrim et al. | |
| 2008/0302748 A1 | 12/2008 | Tsai | |
| 2009/0066140 A1 | 3/2009 | Berent | |
| 2009/0084740 A1 | 4/2009 | Lin | |
| 2010/0003077 A1 | 1/2010 | Kelley | |
| 2012/0080910 A1 | 4/2012 | Davis | |
| 2013/0062294 A1 | 3/2013 | Beaty | |
| 2013/0080286 A1 | 3/2013 | Rotholz | |
| 2013/0170904 A1 | 7/2013 | Cappelle | |
| 2014/0048176 A1 * | 2/2014 | Susnjara | A47B 47/042 144/344 |
| 2014/0048177 A1 * | 2/2014 | Susnjara | B27M 1/08 144/347 |
| 2014/0059829 A1 * | 3/2014 | Weber | A47B 47/042 29/428 |
| 2014/0263130 A1 | 9/2014 | Davis | |
| 2015/0335155 A1 | 11/2015 | Winker | |
| 2017/0023043 A1 | 1/2017 | Koelling et al. | |
| 2017/0079426 A1 | 3/2017 | Davis | |
| 2017/0086578 A1 | 3/2017 | Nowak | |
| 2017/0099961 A1 | 4/2017 | Church | |
| 2018/0112696 A1 | 4/2018 | Davis | |
| 2019/0038023 A1 | 2/2019 | Stocker | |
| 2019/0040890 A1 | 2/2019 | Davis | |
| 2019/0059593 A1 | 2/2019 | Davis | |
| 2019/0059594 A1 | 2/2019 | Davis | |
| 2019/0085886 A1 | 3/2019 | Davis | |
| 2019/0107131 A1 | 4/2019 | Davis | |
| 2019/0254424 A1 | 8/2019 | Rassat | |

FOREIGN PATENT DOCUMENTS

| | | |
|---|---|---|
| DE | 1529719 | 5/1969 |
| DE | 2100168 | 11/1972 |
| DE | 3925302 | 2/1991 |
| DE | 9201692 | 4/1992 |
| DE | 29914896 | 12/1999 |
| DE | 29906711 | 1/2000 |
| DE | 102007058662 | 6/2009 |
| DE | 102014006155 | 10/2014 |
| EP | 0299695 | 1/1989 |
| FR | 1300853 | 8/1962 |
| FR | 2634991 | 2/1990 |
| FR | 2654164 | 5/1991 |
| GB | 143840 | 12/1920 |
| GB | 810752 | 3/1959 |
| GB | 2353080 | 2/2001 |
| NL | 1025719 | 9/2005 |
| WO | WO 2005-085656 | 9/2005 |

OTHER PUBLICATIONS

PlyGrid Shelves viewed at http://offi.com/products/offikids/PLYGRID.php?p2c=249 circa Dec. 3, 2011.

Snap Table viewed at http://www.offi.com/pdfs/snaptable.pdf circa Dec. 3, 2011.

Furniture viewed at http://www.playatech.com/product_list.php circa Dec. 3, 2011.

Arabic Table viewed at http://www.plydea.com/support/assemblypdf.html circa Dec. 3, 2011.

Blue7Chair viewed at http://www.plydea.com/support/assemblypdf.html circa Dec. 3, 2011.

First Desk viewed at http://www.plydea.com/support/assemblypdf.html circa Dec. 3, 2011.

Rinaldo Chair viewed at http://www.plydea.com/support/assemblypdf.html circa Dec. 3, 2011.

Tuffet Stool viewed at http://www.plydea.com/support/assemblypdf.html circa Dec. 3, 2011.

WasteNot Basket viewed at http://www.plydea.com/support/assemblypdf.html circa Dec. 3, 2011.

Winehold Wine Rack viewed at http://www.plydea.com/support/assemblypdf.html circa Dec. 3, 2011.

* cited by examiner

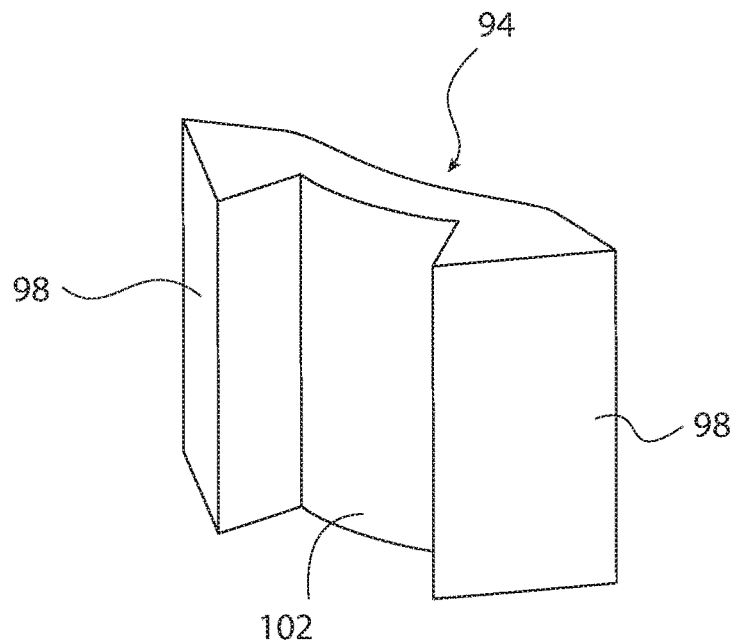
FIG 11A
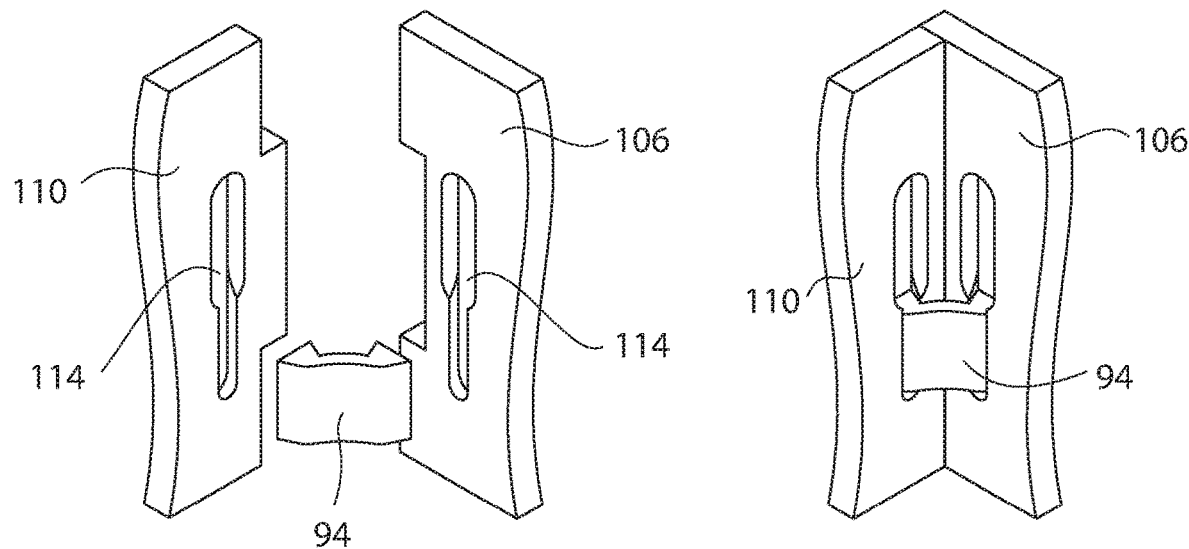
FIG 11B
FIG 11C

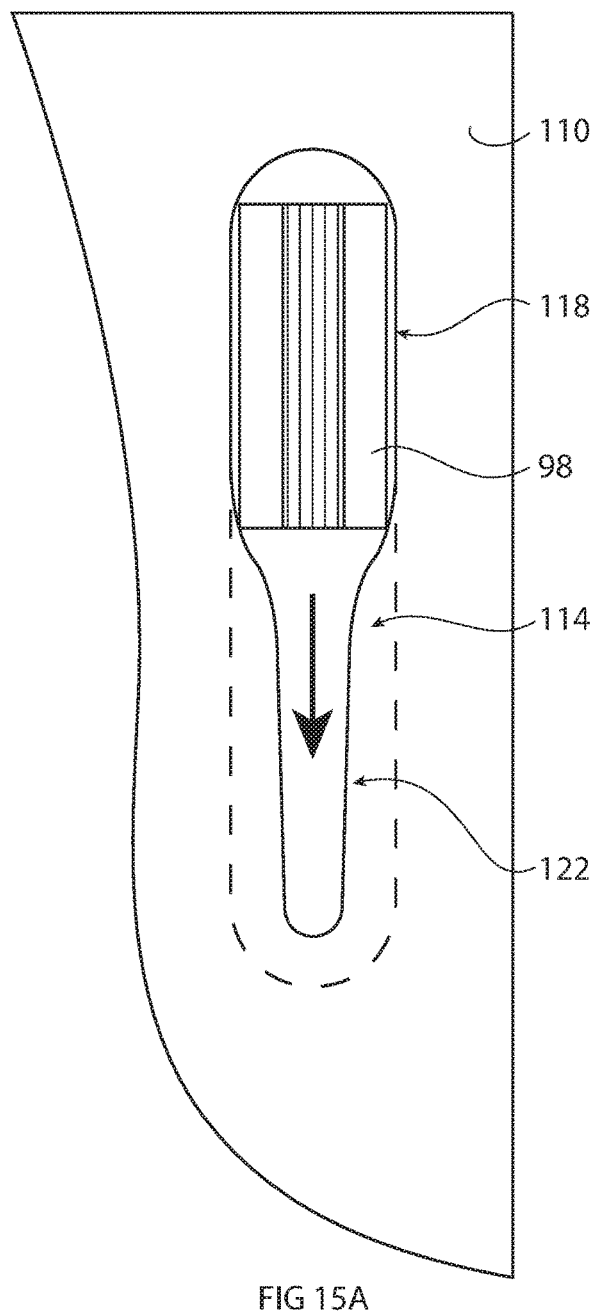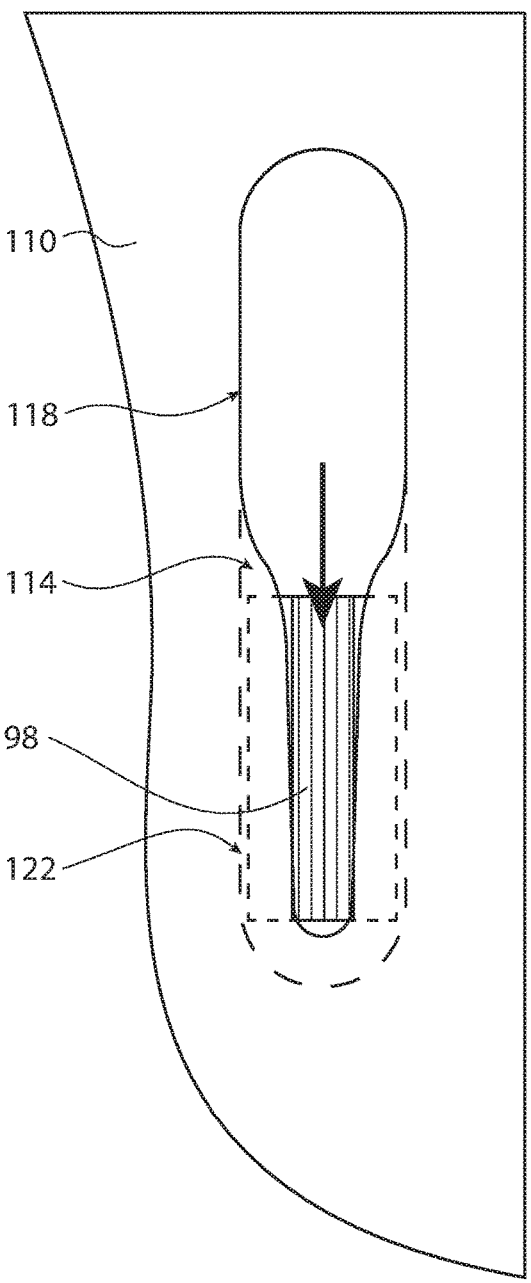
FIG 15A                    FIG 15B

MODULAR FURNITURE WITH DISTRIBUTED PRESSURE PANEL JOINT

RELATED APPLICATIONS

The present application claims the benefit of U.S. Provisional Application Ser. No. 62/413,110, filed Oct. 26, 2016, which is hereby incorporated by reference in its entirety.

THE FIELD OF THE INVENTION

The present invention relates to modular furniture. In particular, examples of the present invention relates to a modular furniture joint which increases the strength of joints between adjacent components of a piece of furniture.

BACKGROUND

Modular furniture which is easily assembled and disassembled is often desirable due to cost, portability, and aesthetic reasons. Many items of furniture may be formed from flat panels which are assembled with minimal or no tools and which may be disassembled and moved or stored in a flat configuration. It is desirable, however, to provide modular furniture designs which are more durable and more stable so that the strength qualities of the modular furniture approach that of traditionally assembled furniture.

BRIEF DESCRIPTION OF THE DRAWINGS

Non-limiting and non-exhaustive examples of the present invention are described with reference to the following figures, wherein like reference numerals refer to like parts throughout the various views unless otherwise specified.

FIG. 11A shows another furniture joint.
FIG. 11B shows another furniture joint.
FIG. 11C shows another furniture joint.
FIG. 15A shows a cross-section of the furniture joint.
FIG. 15B shows a cross-section of the furniture joint.

Figure 1:
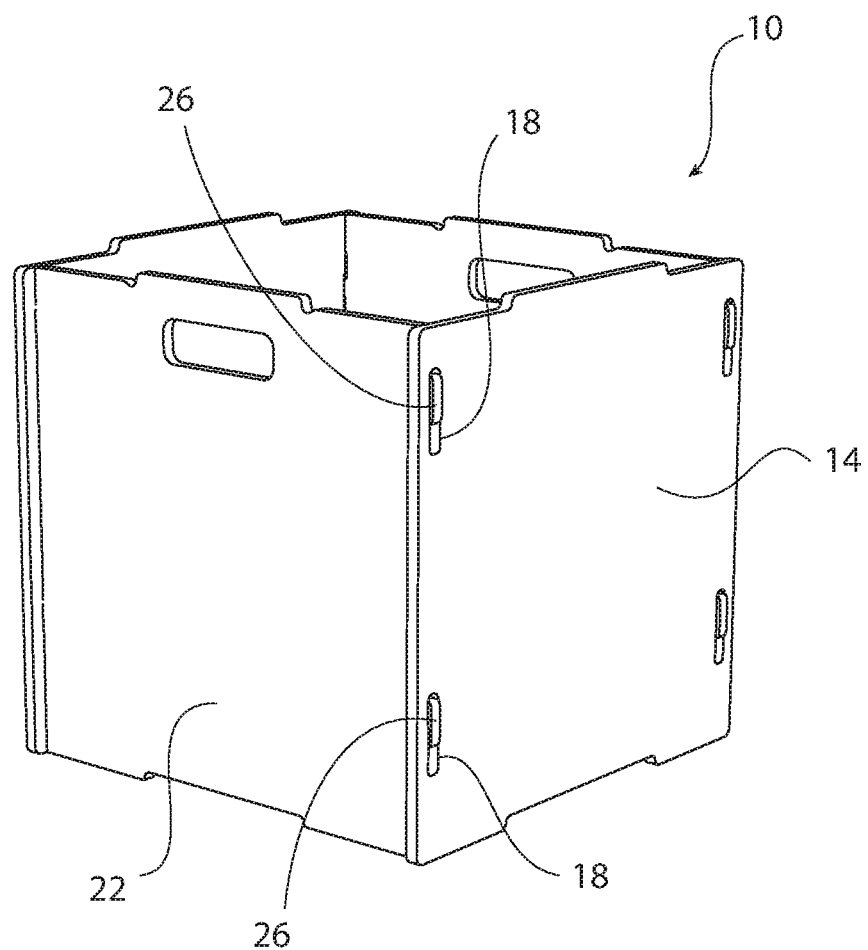
FIG. 1 shows a perspective view of an article of furniture with joints according to the present invention.

Corresponding reference characters indicate corresponding components throughout the several views of the drawings. Unless otherwise noted, the drawings are drawn to scale to facilitate understanding of the invention. Skilled artisans will appreciate that elements in the figures are illustrated for simplicity and clarity. For example, the dimensions of some of the elements in the figures may be exaggerated relative to other elements to help to improve understanding of various examples of the present invention. Also, common but well-understood elements that are useful or necessary in a commercially feasible embodiment are often not depicted in order to facilitate a less obstructed view of these various embodiments of the present invention.

It will be appreciated that the drawings are illustrative and not limiting of the scope of the invention which is defined by the appended claims. The examples shown each accomplish various different advantages. It is appreciated that it is not possible to clearly show each element or advantage in a single figure, and as such, multiple figures are presented to separately illustrate the various details of the examples in greater clarity. Similarly, not every example need accomplish all advantages of the present disclosure.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be used in connection with other embodiments whether or not explicitly described. The particular features, structures or characteristics may be combined in any suitable combination and/or sub-combinations in one or more embodiments or examples. It is appreciated that the figures provided herewith are for explanation purposes to persons ordinarily skilled in the art.

The disclosure particularly describes an improved joint (or method) for joining two or more components to create assemblies such as furniture without the use of tools, fasteners, or adhesives. The components are typically but not necessarily planar components. These joints provide several distinct advantages to traditional methods.

Anisotropic materials such as plywood are not uniform throughout, but have a direction of lesser strength. Plywood, for example, splits or delaminates between layers much more readily than it breaks through the wood layers. The joints discussed herein increase the strength of a tab and slot joint against material failure for planar or panel materials which have a lower strength against splitting into layers or failure between layers parallel to the panel surface. This reduction in strength can cause failure of joints in plywood. In joining anisotropic materials such as wood, plywood, or composites, the yield strength lower strength orientation often limits the strength of the joint. In this invention the geometry of the joint maximizes the ability of the lower strength orientation to handle stress, eliminates stress risers, and uses friction to maximize the strength of the joint.

Additionally, these joints are easily formed with router bits on a three axis CNC router, in a few simple operations.

This invention allows for joints that are flush or hidden from the exterior where prior art joints protrude through the adjoining piece in order to provide adequate strength.

Ultimately, this joint allows for more aesthetically pleasing, easier to assemble, higher strength products made from thinner and lighter material leading to a lower cost for the consumer.

FIG. 1 shows a stackable storage box that uses the present joint to join panels together. The joint may be similarly applied to different items of modular furniture 10, such as desks, shelves, or bookcases. A furniture joint includes a first panel 14 with a slot 18 and a second panel 22 with a tab 26. As shown, a single joint often includes two or more tabs 26 and corresponding slots 18. The tabs are inserted into the slots and then moved laterally to secure the joint. The shapes of the tabs 26 and slots 18 have been optimized to resist delamination of the panels 14, 22 along glue planes or weaker planes.

Figure 2A:
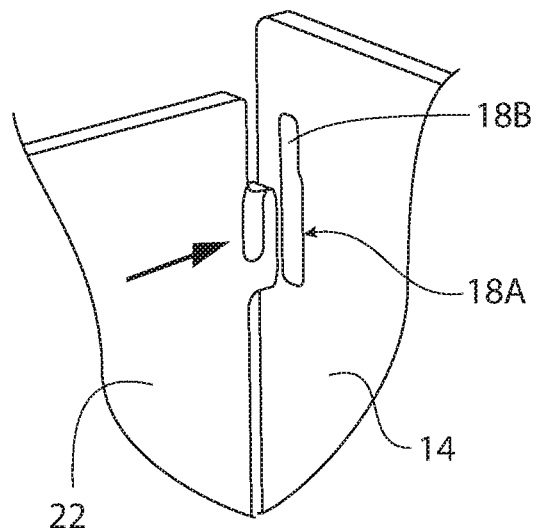
FIG. 2A shows a detailed view of the furniture joint.
Figure 2B:
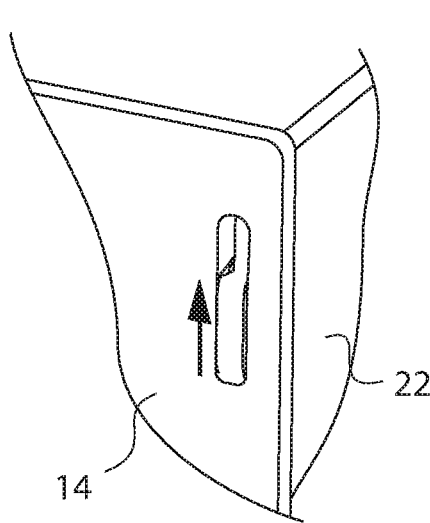
FIG. 2B shows a detailed view of the furniture joint.
Figure 2C:
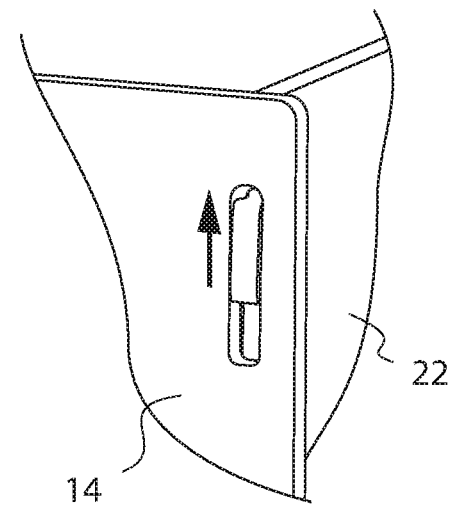
FIG. 2C shows a detailed view of the furniture joint.

FIGS. 2A-2C shows how the joint assembles. Per 2A, the tab of the second panel 22 enters the larger portion of the slot on the first panel 14. Per 2B, once the tab has entered, the second panel slides up relative to the first panel. Per 2C, the final position of the joint has the tab constrained in all directions except one by the slot. FIG. 2A shows how the slot includes an open insertion portion 18A and a narrower restraining portion 18B. The tab 26 is inserted into the open portion 18A and then slid laterally into the restraining portion 18B.

Figure 3A:
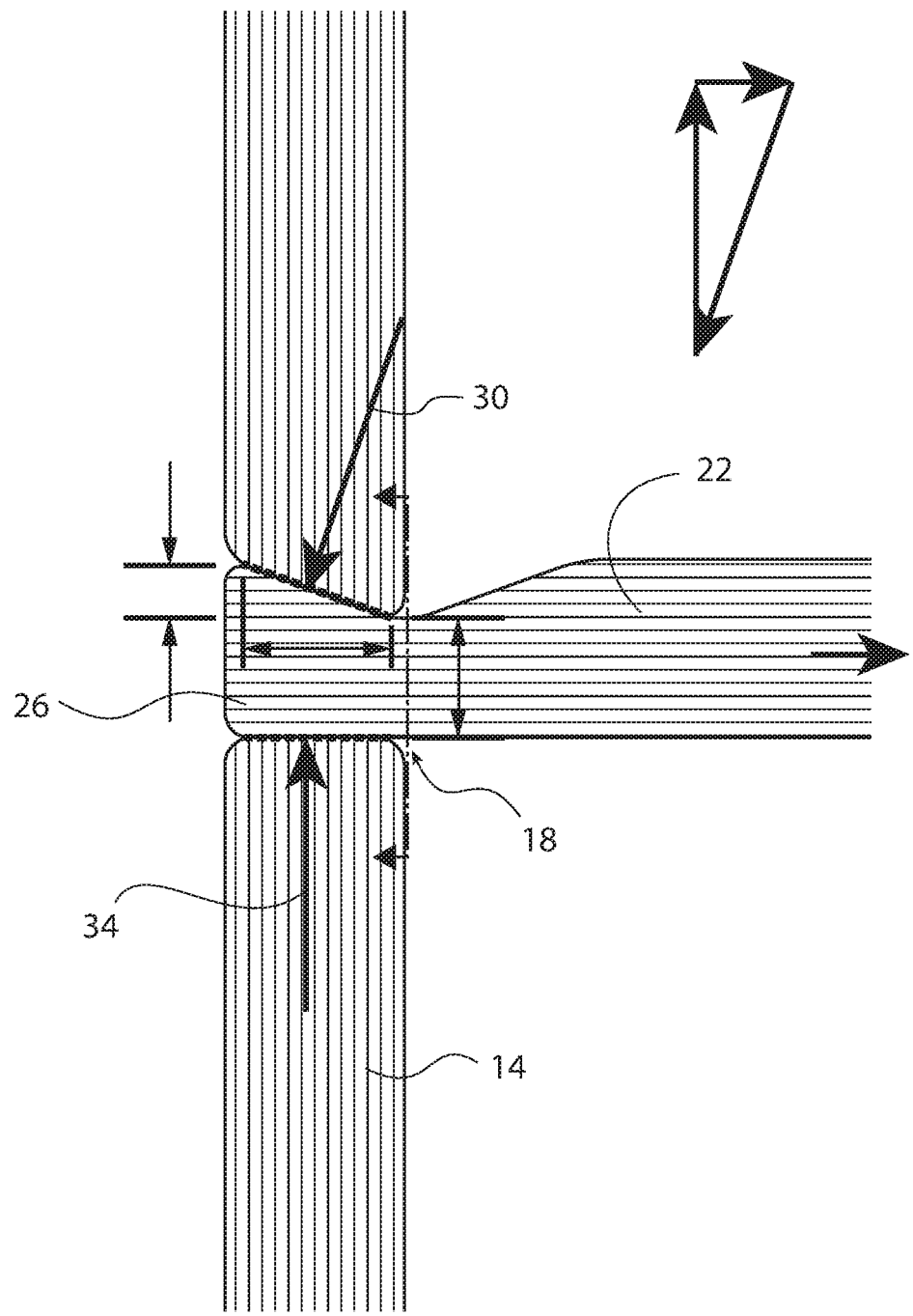
FIG. 3A shows a cross-section of the furniture joint.
Figure 4A:
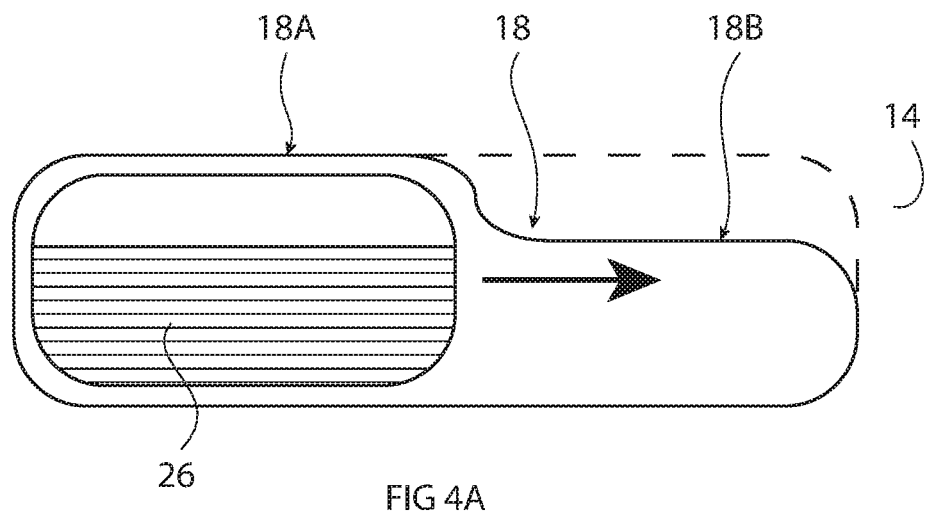
FIG. 4A shows a cross-section of the furniture joint.
Figure 4B:
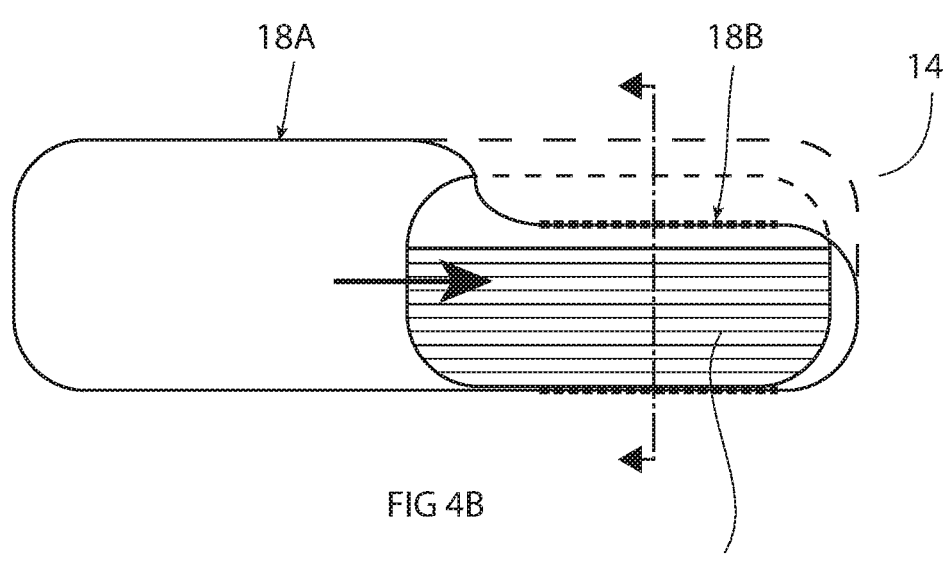
FIG. 4B shows a cross-section of the furniture joint.

FIG. 3A shows a cross-section of an embodiment of the joint taken through the restraining portion 18B of the slot at the location shown in FIG. 4B. Cross-sectional lines in the panels indicate the grain direction of the material (such as plywood) and in laminated materials they indicate the plies (plywood or medium-density fiberboard). These materials are thus prone to splitting along the cross-sectional lines in the two panels. The slot 18 is formed with a straight side wall and an opposed tapered sidewall. The tab 26 includes a straight face (which is typically formed by an unmachined face of the panel material) and a tapered face. As shown, the shape of the tab 26 is complementary to the shape of the slot 18. It is seen how cutting into a layered (or anisotropic) material cuts through layers of the material and the material may split along these layers. If the tab 26 is pulled out of the slot 18, a compressive force is applied to the tab 26 as indicated by arrows 30 and 34. The compressive force 30 applied by the angled sidewall of the slot 18 compresses the exposed layers of the tab 26 and helps prevent delamination failure of the material. Failure of the material is typically more likely to occur in peel or in tension as the cut away portion of a tab is lifted from the remaining layers of the panel by the joint stress. The illustrated joint avoids this lifting tension placed on the tab layers and instead places the cut layers of the tab in compression. This shifts the failure mode to shear and makes failure less likely.

The various forces at play (assuming an ideal, frictionless surface) are indicated per the large black arrows. The two positions where surfaces touch and push together are indicated with the thick dotted lines. Additionally the high compressive forces help prevent delamination between layers in plywood, or grain in wood, which is the primary failure mode.

The three dimensions which determine the strength of the joint are indicated. The angle and depth of the cut can be optimized to create a joint where all failure modes are simultaneously resulting in the strongest overall joint. Dimension A distributed shear force in the horizontal component along the entire width of the vertical component. Dimension B can be increased to prevent tear out of the vertical component, trading off with the breaking of the horizontal component at its narrowest dimension C. In this case the slot is assumed rigid, but in cases where there is a small amount of material around the slot, the slots flexibility should also be considered.

Figure 3B:
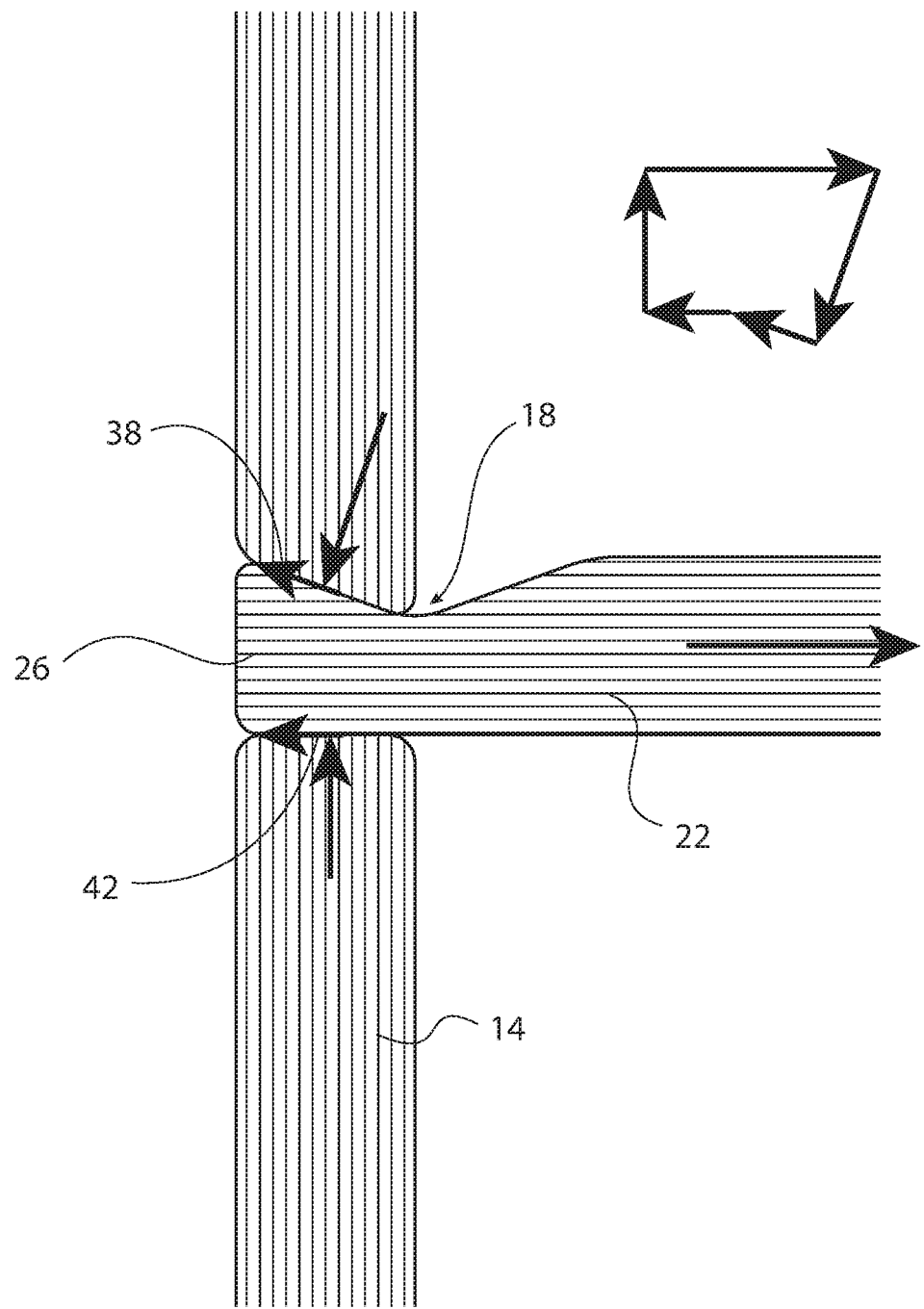
FIG. 3B shows a cross-section of the furniture joint.

FIG. 3B shows a cross-section of the standard embodiment of the joint, going into further detail regarding the various forces present, including friction. The arrows 38, 42 which are tangential to the surface of the tab 26 help keep the tab 26 from being pulled from the slot 18. Wood on wood friction coefficients are quite high and can significantly increase the strength of the joint.

FIG. 4A shows a cross section of the tab 26 near its base and the first panel 14 and slot 18 near the tab. The view is shown facing towards the end of the tab at the location shown in FIG. 3A. This diagram shows how the tab is able to be inserted into the larger end 18A of the slot.

FIG. 4B shows the tab 26 moved laterally into the narrowed engaging portion 18B of the slot 18. This illustrates how the geometry of the tab and the geometry of the slot allow the tab 26 to slide behind a portion of the sidewall of the slot 18, constraining the tab from pulling out of the slot without first moving laterally. The dashed lines between the tab 26 and slot 18 indicate the engagement surfaces between the tab and the slot as force is applied to pull the tab out of plane, as would happen during normal use an assembly constructed with components utilizing this joint.

FIG. 4B-5D show a variety of alternative configurations in which the slot can be constrained in the slot as force is applied to the panel with the tabs to pull them away from the panel containing the slots. These constraint methods become more valuable if some amount of flexure of the panel with the tabs during insertion is used create increased tension between the parts to prevent unintentional disassembly.

Figure 5A:
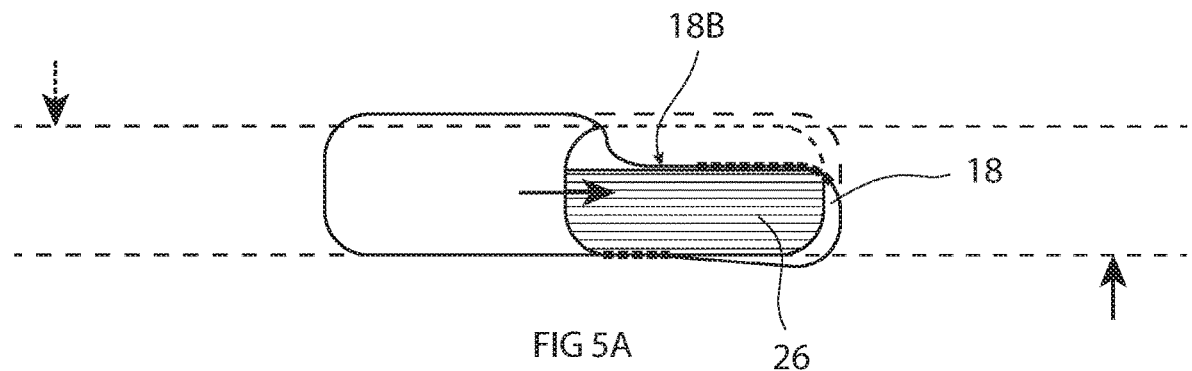
FIG. 5A shows a cross-section of the furniture joint.

FIGS. 5A through 5D show different ways that the tab 26 can be restrained in the slot 18. FIG. 5A shows a joint where the narrow engaging portion 18B of the slot is machined at an angle and contact is made on opposite sides and ends of the tab (the upper right and lower left) as it is inserted into the slot. The slot 18 thus twists the tab 26 as it is inserted into the slot. This also requires some means of constraining the second panel such as a second tab and slot to prevent rotation of the entire second panel instead of twisting the tab. This could be achieved by constraining the panel at either end in the vertical direction as illustrated. This method may allow for a slightly higher amount of play in the joint out of plane, but very little if the panels are stiff and the length of the tab relatively short (e.g. less than 2 inches)

Figure 5B:
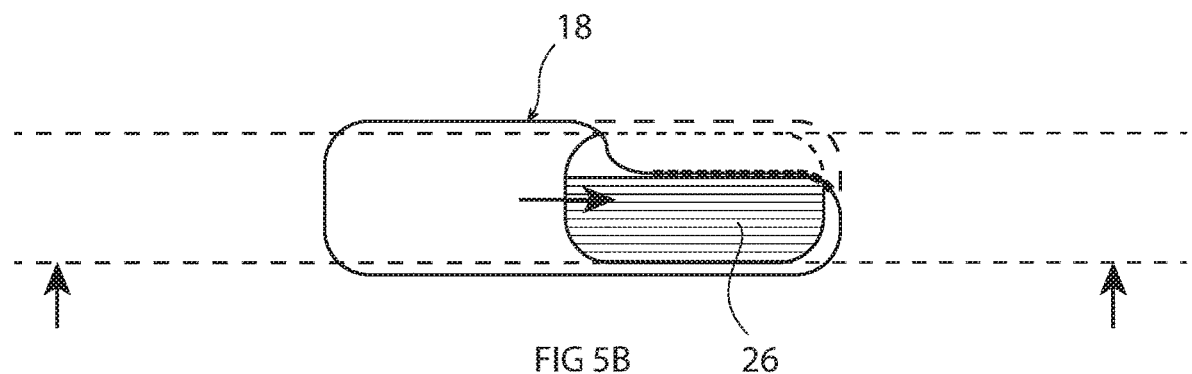
FIG. 5B shows a cross-section of the furniture joint.

FIG. 5B shows a joint where the only mating surface inside the joint is on the inclined face, but other constraints prevent vertical translation and rotation. For example, the illustrated tab 26 and slot 18 could be located in the middle of the panel and two other tabs and slots (e.g. at the areas indicated by arrows on the left and right) could be used to push the panel upwards. The second panel 22 would be bent slightly between the three tabs and force the middle tab 26 upwardly against the top, angled surface of the slot 18. This joint would allow for more play unless tightly constrained, however the lower surface of the slot could come into play if sufficiently close, at which point the constraint would be similar to that illustrated in FIG. 4B with force distribution shifted to the upper face.

Figure 5C:
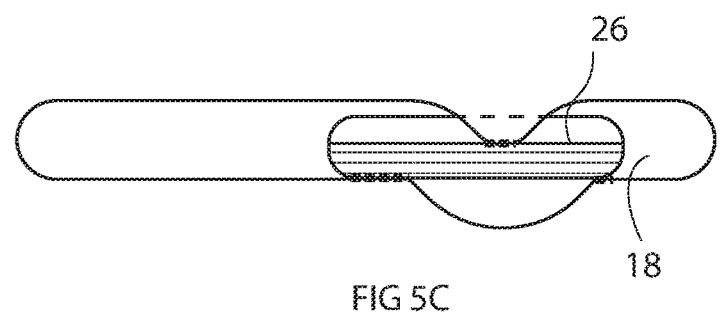
FIG. 5C shows a cross-section of the furniture joint.

FIG. 5C shows a joint that is particularly useful in joints with thin tab materials requiring a slot that may be thinner than is reasonable to make economically due to limitations in the rigidity of common router bits. This slot can be made with a router bit with a larger diameter than the thickness of the material, but still provides the needed constraint to prevent separation of the joint. A variation of this joint could be made where contact with the lower right corner only occurs as a fail stop if rotation of the panel is constrained through other means. If desired, the slot 18 could be machined so that force is applied to the tab 26 at the contact points to tend to bend the tab between the three contact points. This would stiffen the joint between the panels 14, 22.

Figure 5D:
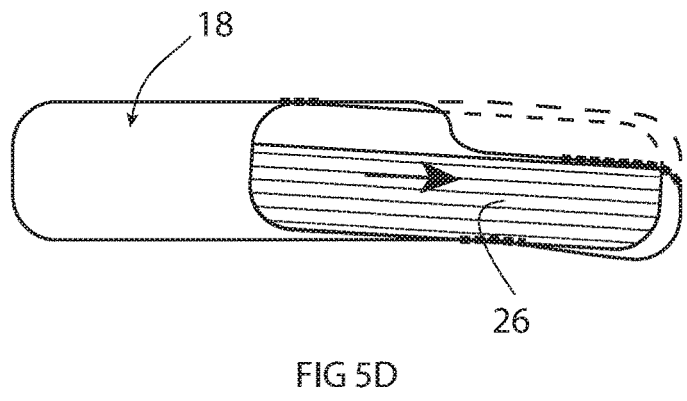
FIG. 5D shows a cross-section of the furniture joint.

FIG. 5D illustrates a joint where the entire panel 22 rotates as the tab 26 is inserted into the slot 18. The first panel 14 and second panel 22 can be connected with a single tab and slot joint, and rotation of the panel 22 could be prevented through contact of that panel 22 with another panel in the article of furniture. For example, panel 14 could be a side panel and panel 26 could be a shelf panel, and the slot 18 could tend to rotate the panel 22 as indicated by the tab 26 and the end of the panel 22 could contact a back panel to prevent rotation of panel 22, applying some stress to the joint.

Figure 6A:
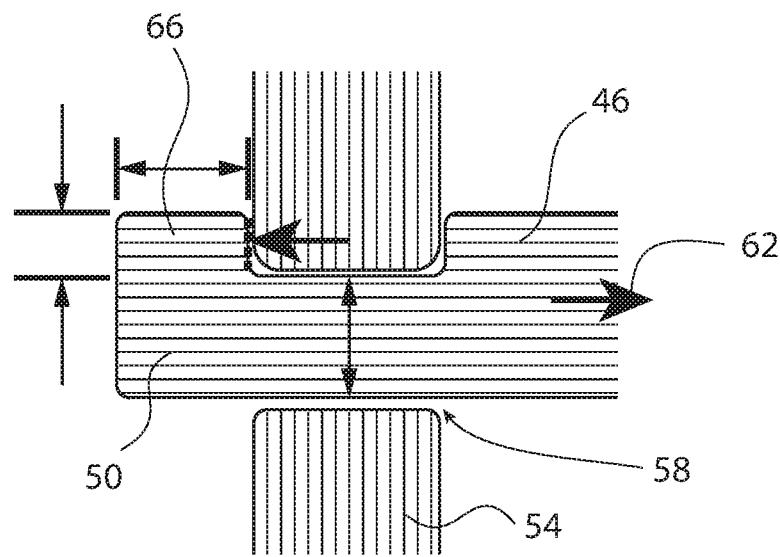
FIG. 6A shows a cross-section of the furniture joint.
Figure 6B:
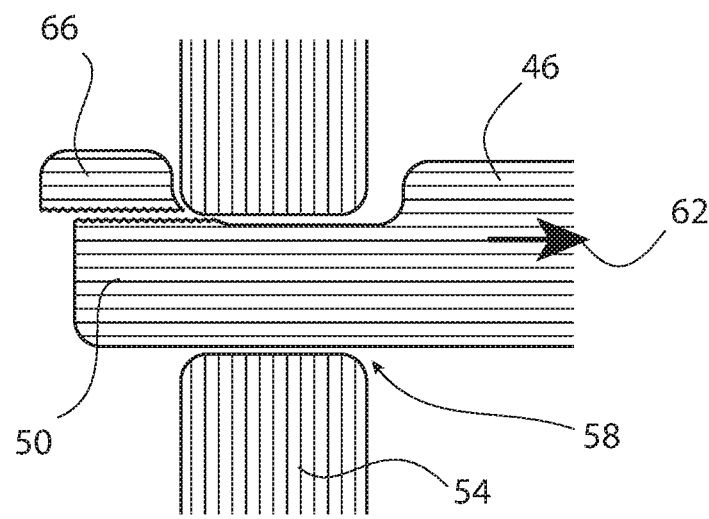
FIG. 6B shows a cross-section of the furniture joint.

FIG. 6A shows prior art joint. Panel 46 with tab 50 is inserted into panel 54 with slot 58. If force is applied to panel 46 in the direction of arrow 62, the force tends to lift and press against the retaining portion 66 of the tab 50. FIG. 6B shows how this prior art joint is likely to fail by breaking off portion 66 of the tab 50 due to all the force being concentrated upon a single layer of the panel material.

Figure 7A:
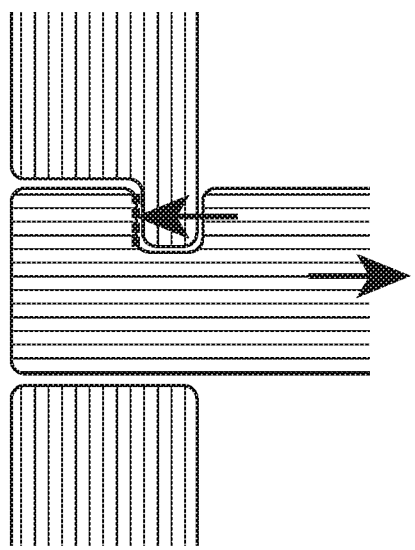
FIG. 7A shows a cross-section of the furniture joint.
Figure 7B:
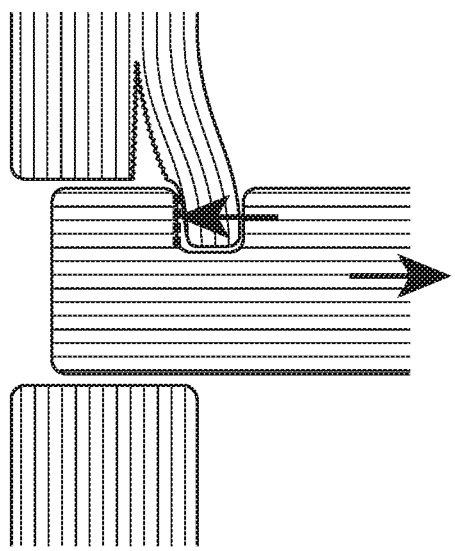
FIG. 7B shows a cross-section of the furniture joint.

FIG. 7A shows a different embodiment of a prior art joint cut into a layered material. FIG. 7B shows how this different embodiment of the joint can fail in tension, with all the force being concentrated against a few laminations, tearing out.

Figure 8A:
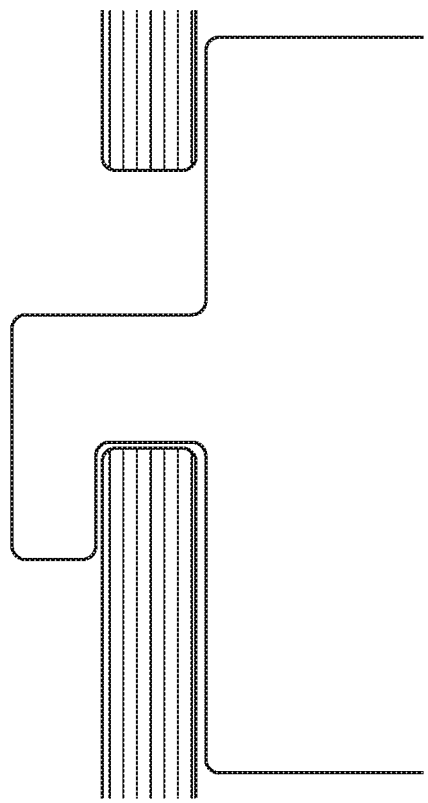
FIG. 8A shows a cross-section of the furniture joint.

FIG. 8A shows prior art for a joint design that has significant difference, and can be high in strength but requires significant protrusion by the tab which negatively impacts the appearance of the resulting furniture.

Figure 8B:
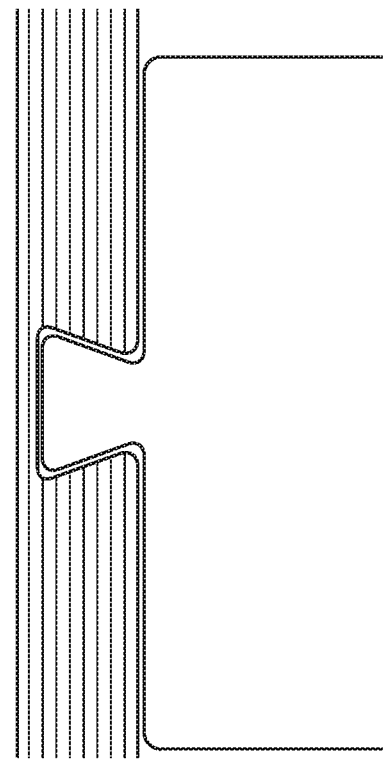
FIG. 8B shows a cross-section of the furniture joint.

FIG. 8B shows prior art for a dovetail joint which is limited in the orientation of the panels, creating a weak and narrow dovetail tab oriented perpendicular to its associated panel.

Figure 9A:
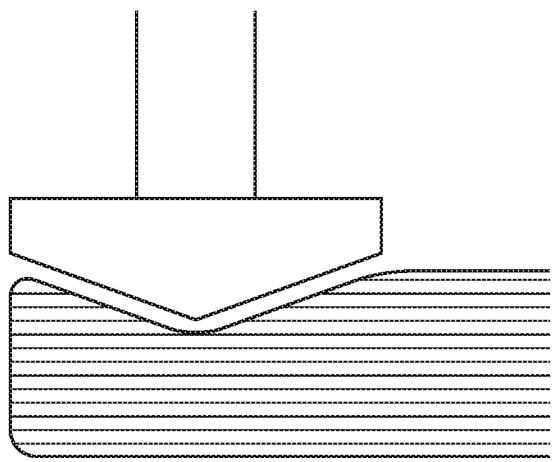
FIG. 9A shows an example manufacturing process for the furniture joint.

FIG. 9A shows how a router bit could cut the diagonal surface on the tab 26 in a panel 22.

Figures 9B, 9C:
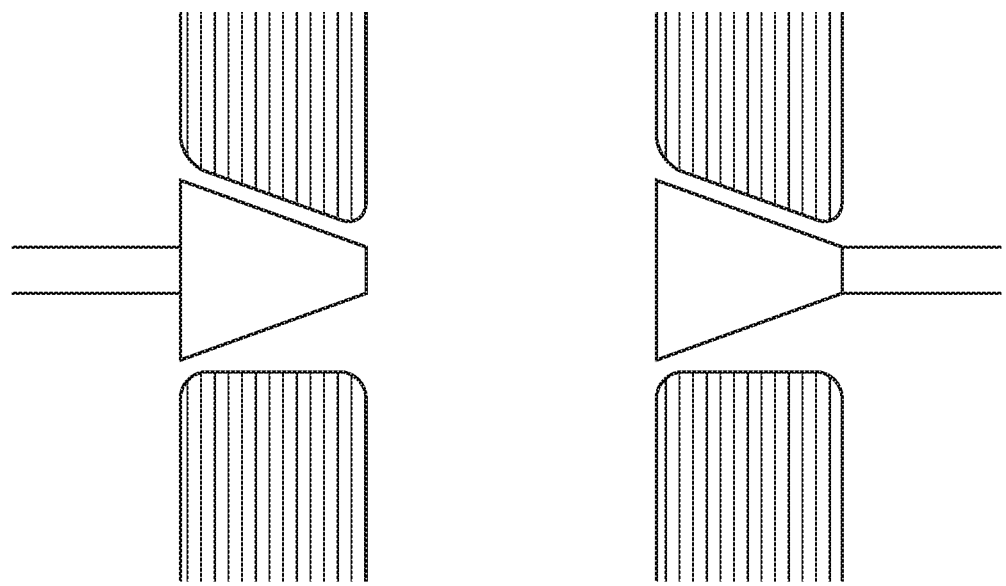
FIG. 9B shows an example manufacturing process for the furniture joint.
FIG. 9C shows an example manufacturing process for the furniture joint.

FIG. 9B shows how a router bit could cut the diagonal surface on the slot 18 from the far side of a panel 14.

FIG. 9C shows how a router bit could cut the diagonal surface on the slot 18 from the near side of the panel 14.

FIGS. 10A through 10F show cross sections through the tab 26 and the narrowed, engaging portion 18B of the slot 18.

Figure 10A:
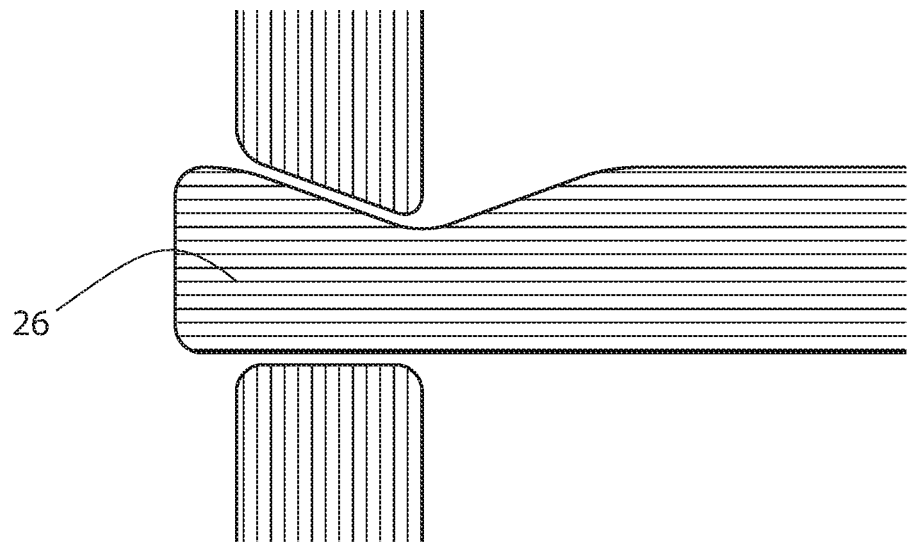
FIG. 10A shows a cross-section of the furniture joint.

FIG. 10A shows a variation of the joint which would not be flush, but would have greater strength against failure of the tab 26

Figure 10B:
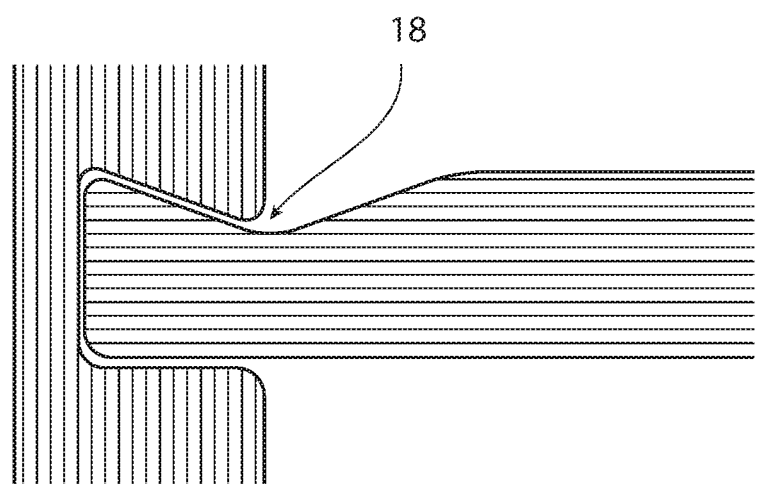
FIG. 10B shows a cross-section of the furniture joint.

FIG. 10B shows a variation of the joint which leaves a thin skin on the bottom of the slot 18, creating a hidden joint from the exterior.

Figure 10C:
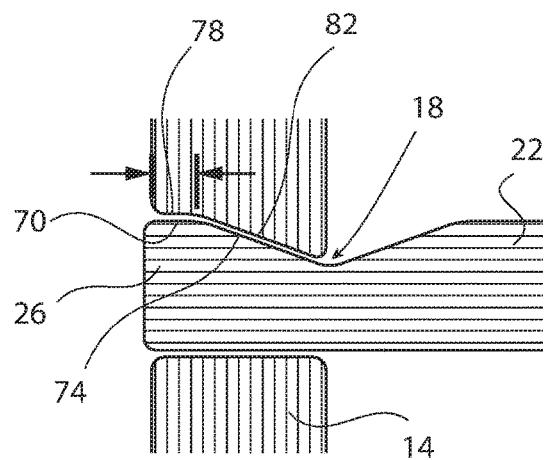
FIG. 10C shows a cross-section of the furniture joint.

FIG. 10C shows a variation of the joint which improves the strength of the tab 26. The top material layers of the tab 26 as formed in FIG. 3A have relatively little surface area connecting them to the adjacent layer of material (e.g. plywood plies) and may delaminate if excessive force is applied to them such as if handled roughly during transit. These top layers may also delaminate or splinter occasionally during machining. To correct this and increase the strength of the tab 26, the sloped angle face of the tab is machined to a lesser depth. This results in a tab with a flat surface 70 which is parallel to the face of the panel 22 and an inwardly sloping face 74 which tapers to a reduced thickness where it is coincident with the panel edge and the face of panel 14. The slot 18 is formed with a corresponding flat side wall 78 and an adjacent tapering side wall 82 resulting in the bottom of the slot being wider than the opening of the slot. This tab 26 is less susceptible to damage from handling.

Figure 10D:
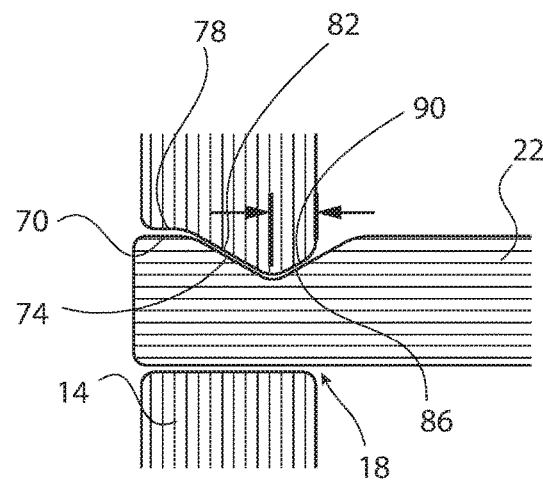
FIG. 10D shows a cross-section of the furniture joint.

FIG. 10D shows a variation of the joint which would hide a portion of the opposite, unused diagonal surface of the tab 26, allowing for better aesthetics in the furniture. The tab 26 is formed in panel 22 so that the point of the router bit and the resulting valley cut into the panel 22 is offset from the adjacent edges of panels 14 and 22, placing the center of the V cut into the tab 26 and into the slot 18. The tab 26 thus includes a flat surface 70 which is parallel to the face of the panel 22, an adjacent tapering face 74 where the tab 26 is reducing in thickness as it moves towards the panel 22, and another tapering face 86 where the tab 26 is increasing in thickness moving towards the panel. The slot 18 is formed with a flat face 78, an adjacent tapering (angled relative to the panel 14) face 82 which is reducing the width of the slot 18, and an adjacent tapering face 90 which is increasing the width of the slot 18. This tab and slot are stronger as the tab 26 does not include an outer edge of very narrow plies and the edge most plies of the slot (those at the narrowest portion of the slot) are located inside of the face of the panel 14 instead of along the panel face. This makes these plies less likely to delaminate and less likely to sustain cosmetic damage from handling.

Figure 10E:
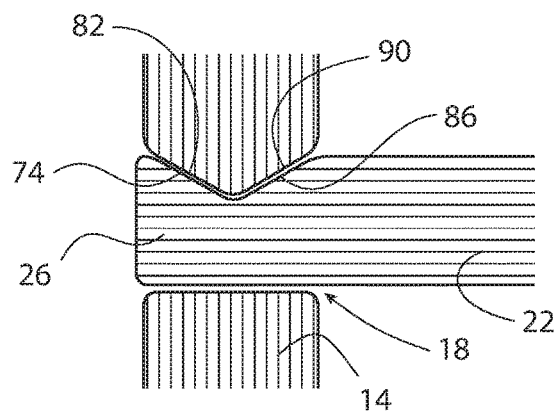
FIG. 10E shows a cross-section of the furniture joint.

FIG. 10E shows a variation of the joint which would completely hide the opposite, unused diagonal surface of the tab 26, potentially allowing for better furniture aesthetics. The tab 26 is formed with the V cut centered at the center of the tab or more than 50 percent out along the width of the tab from the edge of the panel 22 which engages the panel 14. Thus results in a tab 26 with a downwardly sloping face 74 and an adjacent upwardly sloping face 86. The slot 18 has a corresponding inwardly sloping face 82 and adjacent outwardly sloping face 90. It will be appreciated that, if the point of the V cut used to form the face of the tab 26 is moved inwardly and upwardly along surface 86 (and the slot is modified accordingly), the cuts of the tab 26 remain hidden by panel 14 and the sharp edge and narrow plies at the tip of the tab 26 are eliminated.

Figure 10F:
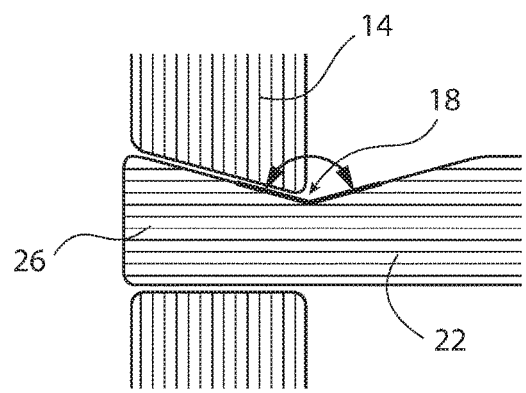
FIG. 10F shows a cross-section of the furniture joint.

FIG. 10F shows a variation of the joint which has a shallower diagonal cut, potentially creating a stronger joint with higher compressive forces and higher friction but which may allow more horizontal play in the joint due to the slot flexing under the high compressive forces.

These tabs 26 are also advantageous as they machine the face of the panel 22 at the tab 26, eliminating variation in the nominal thickness of materials such as plywood. Variation in nominal thickness has previously required a slightly wider slot 18, allowing the thickest of the materials to fit. This results in a loose joint on the average or thinner materials. Since the thickness of the tab 26 is machined, the slot 18 can be machined more precisely.

FIG. 11A shows a geometric connector body 94 which could be used to create a tool-less joint for panel casing and furniture which is easily disassembled. This connector 94 could be made by a variety of manufacturing processes by could be produced quite economically through aluminum or plastic extrusion or plastic injection molding. The connector includes two tab ends 98 connected by a flexible bridge 10. The tab ends 98 are formed as T shaped members or tapering dovetail shaped members (as drawn) and fit into corresponding T slots or dovetail slots in two panels. The bridge 102 is bent or stretched slightly when the connector 94 is installed, using the flexibility of the connector material to press the panels together.

FIG. 11 B shows the connector 94 and two panels 106, 110 to be joined, each with a dovetail slot 114 with an open portion that receives the tab end 98 and a narrowed, engaging portion which holds the connector 94 in the slot via a slot and tab end which are wider at their ends. The tab ends 98 are inserted into the open end of the slot and then slid downward into the narrowed, engagement parts of the slots 114, securing the joint. Usually, multiple panels would be joined together, each which multiple connectors 94, giving additional rigidity the furniture assembly. A box joint, finger and slot, or some other means may used to prevent the panels from sliding vertically relative to each other as well as moving inward toward each other. When installed the connector 94 constrains outward movement. The joint can also readily be disassembled and reassembled. FIG. 11C shows the joint after assembly.

Figure 12A:
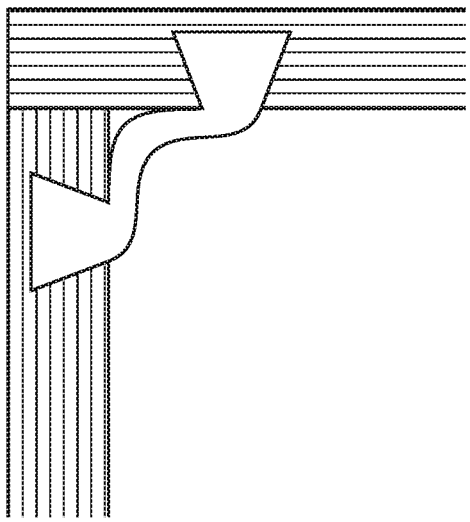
FIG. 12A shows a cross-section of the furniture joint.

FIGS. 12A through 12M show different variations of this joint. Each includes a connector body 94 and panels 106, 110 with slots 114. Each drawing is shown in cross section through the narrowed engagement portion of the slot 114. For clarity, not each drawing is numbered. FIG. 12A shows the standard embodiment of this tool-less joint. A dovetail slot is machined near the ends of two flat panels at a precise location, allowing the dovetail ends of the geometric connector body to slide in and hold the two panels together at a 90 degree angle. The slight curve of the bridge 102 between the two dovetails allows it to stay as out-of-the-way as possible in the assembled furniture.

Figure 12B:
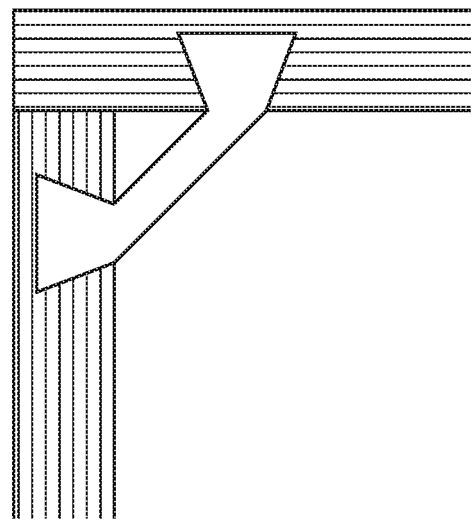
FIG. 12B shows a cross-section of the furniture joint.

FIG. 12B shows a variation of the geometric connector body, with a straight length of bridge material between the two dovetails (tab ends 98) which may be simpler to manufacture.

Figure 12C:
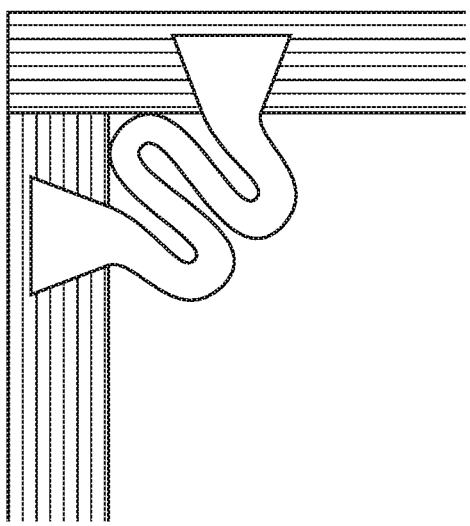
FIG. 12C shows a cross-section of the furniture joint.

FIG. 12C shows a variation of the geometric connector body, with a longer, curved length of bridge material between the two dovetails, potentially providing compliance in the body to compensate for machining in accuracies, variation in wood, or to allow for a more consistent force on the joint by intentionally creating moving the slots outward and requiring more flexure in the connector body during installation.

Figure 12D:
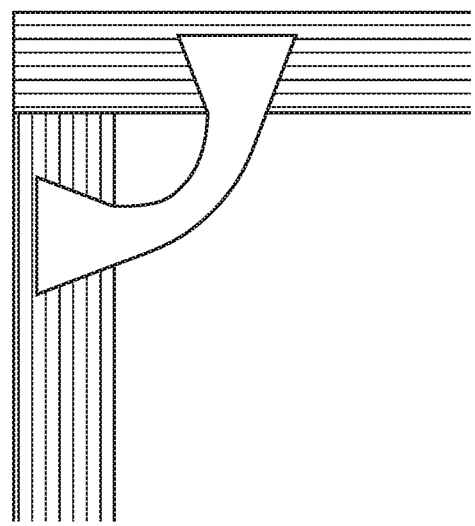
FIG. 12D shows a cross-section of the furniture joint.

FIG. 12D shows a variation of the geometric connector body, with an outward curved length of material between the two dovetails which allows some flexure.

Figure 12E:
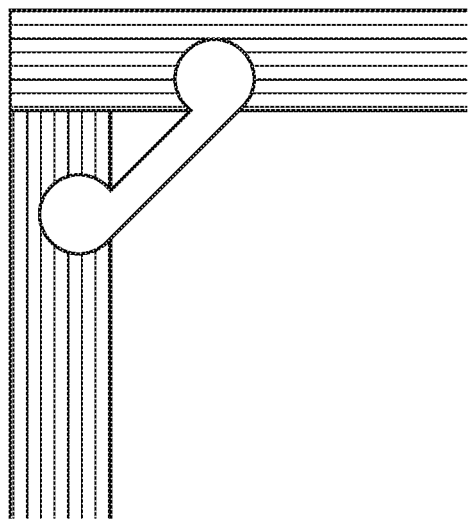
FIG. 12E shows a cross-section of the furniture joint.

FIG. 12E shows a variation of the geometric connector body, with a cylindrical or spherical ends instead of dovetails, with matching slots on the panels.

Figure 12F:
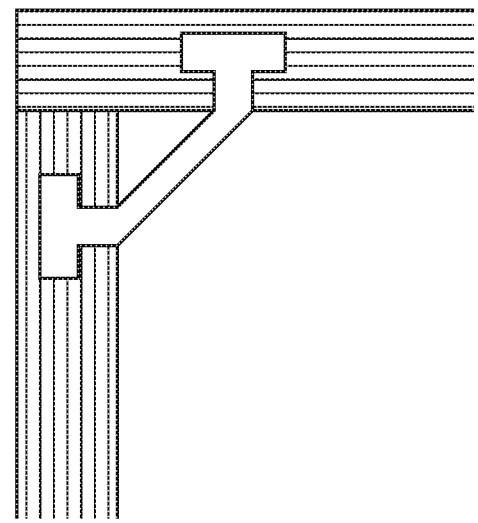
FIG. 12F shows a cross-section of the furniture joint.

FIG. 12F shows a variation of the geometric connector body, with a T-end on the ends, and a matching T-slot on the panels.

Figure 12G:
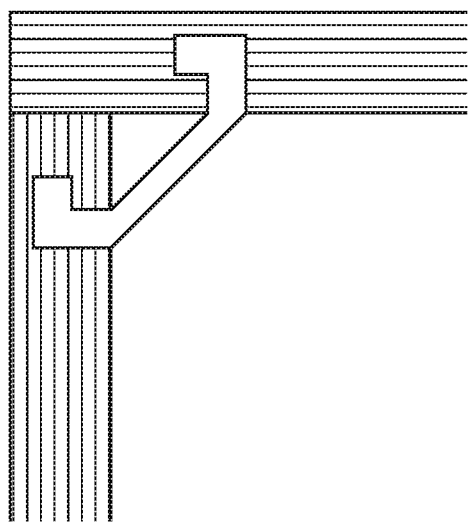
FIG. 12G shows a cross-section of the furniture joint.

FIG. 12G shows a variation of the geometric connector body, with an L-end on the ends, and a matching L-slot (or a more easily manufactured T Slot) on the panels.

Figure 12H:
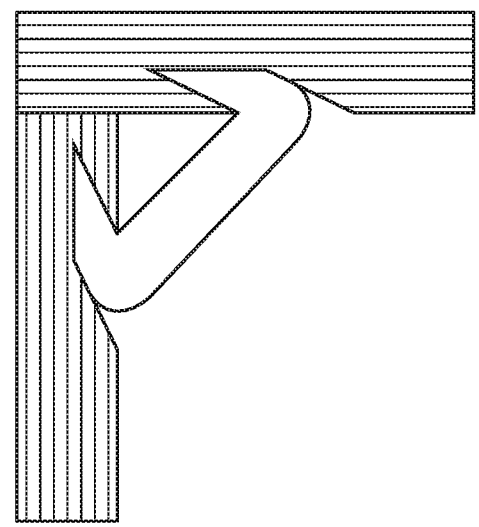
FIG. 12H shows a cross-section of the furniture joint.

FIG. 12H shows a variation of the geometric connector body.

Figure 12J:
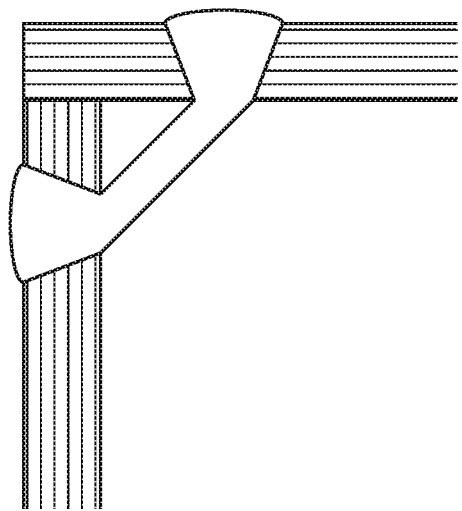
FIG. 12J shows a cross-section of the furniture joint.

FIG. 12J shows a variation of the geometric connector body, with a thru-dovetail on the ends, and a matching slot on the panels which allow for use in thinner materials and may add any aesthetic appeal.

Figure 12K:
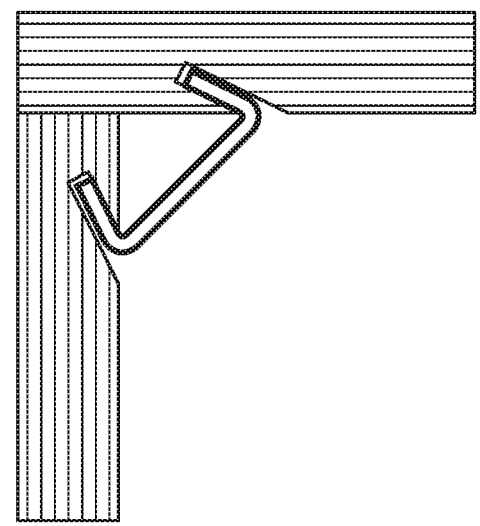
FIG. 12K shows a cross-section of the furniture joint.

FIG. 12K shows a variation of the geometric connector body, with the geometric connector body being a bent piece of sheet metal, with a matching slot on the panels.

Figure 12L:
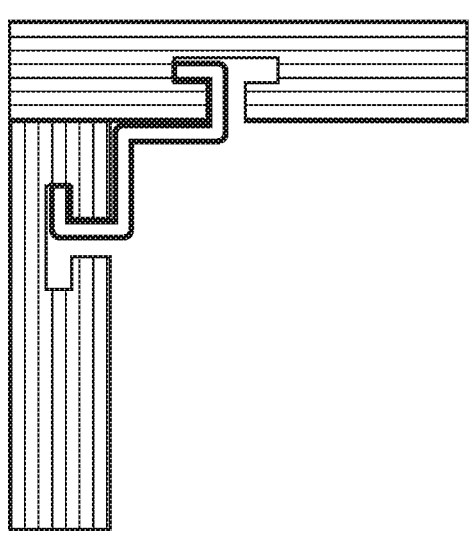
FIG. 12L shows a cross-section of the furniture joint.

FIG. 12L shows a variation of the geometric connector body, with the geometric connector body being a bent piece of sheet metal, with a matching T-slot on the panels.

Figure 12M:
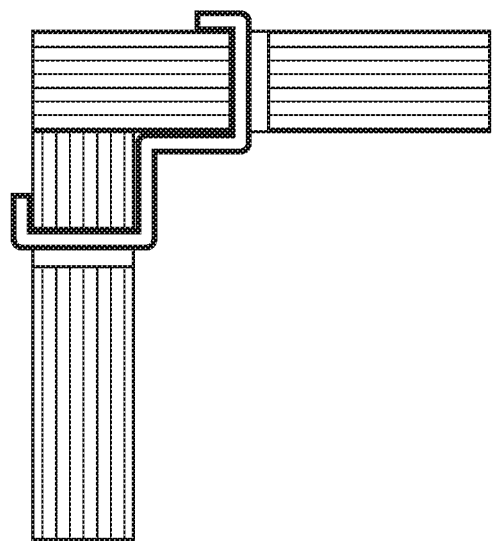
FIG. 12M shows a cross-section of the furniture joint.

FIG. 12M shows a variation of the geometric connector body, with the geometric connector body being a bent piece of sheet metal, which goes through a slot on the panels, and grabs the far side of the material.

Figure 13A:
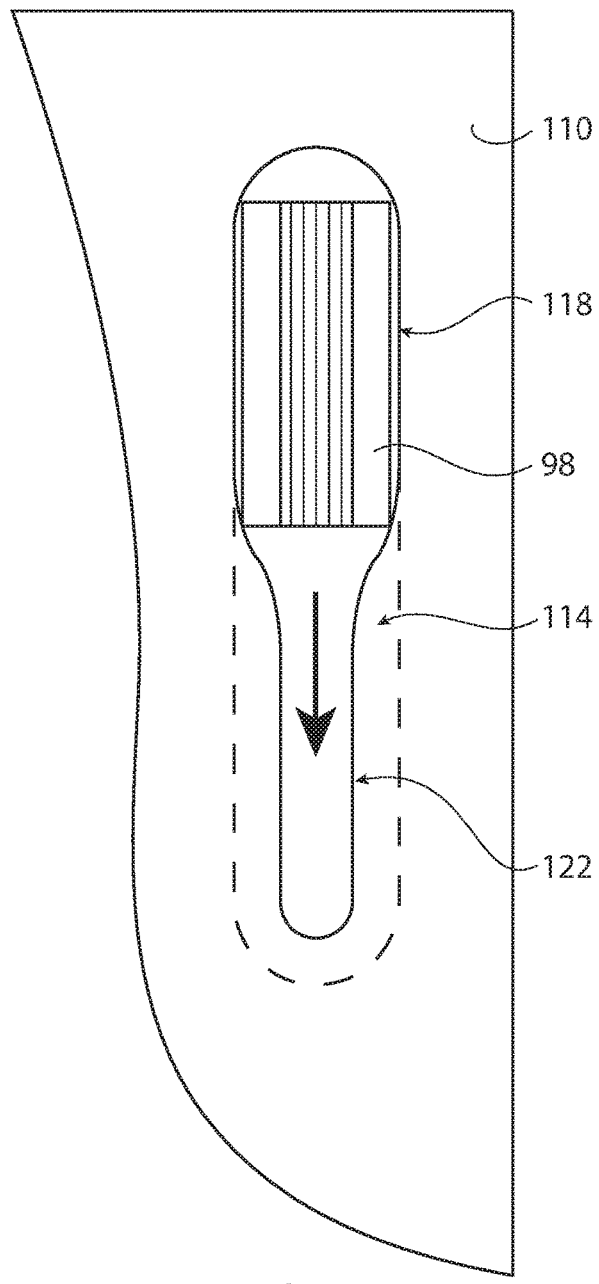
FIG. 13A shows a cross-section of the furniture joint.
Figure 13B:
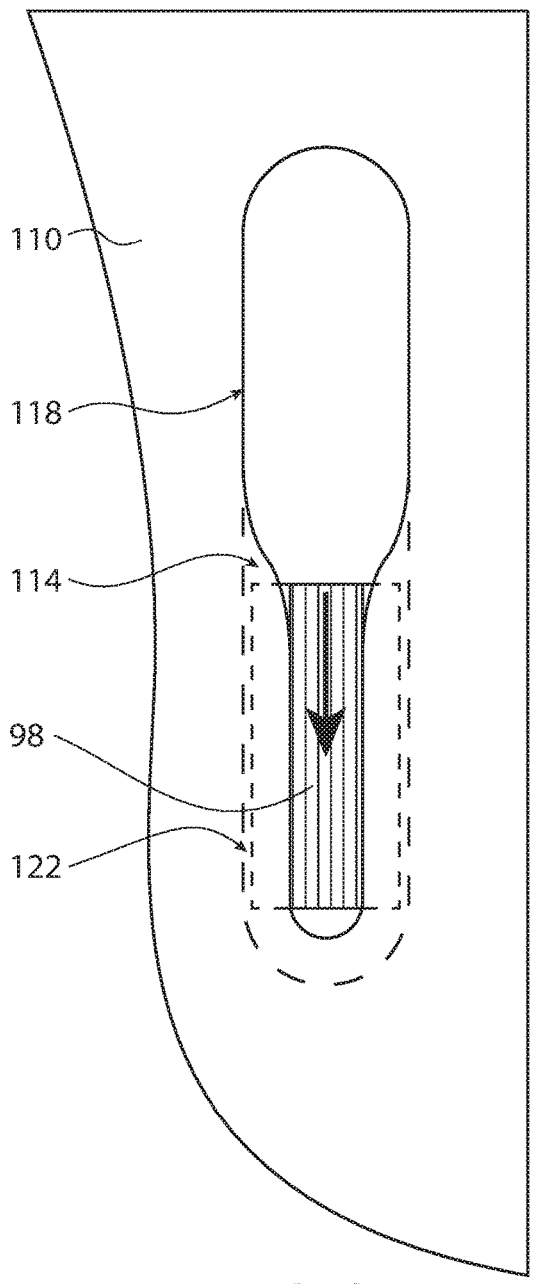
FIG. 13B shows a cross-section of the furniture joint.

FIG. 13A shows a cross section of the embodiment of the geometric connector body pf FIG. 11A near the base of one of the slots, facing towards the end of the slot. The panel 110 and slot 114 are shown. The slot 114 is cut with a router bit, and has an open insertion portion 118 which allows the tab end 98 to enter the slot, and an undercut engagement portion 122, which the tab 98 slides into and then is constrained from being pulled out of the slot before first sliding laterally into the open portion 118. FIG. 13B shows the tab 98 in the undercut engagement portion 122 of the slot 114.

Figure 14A:
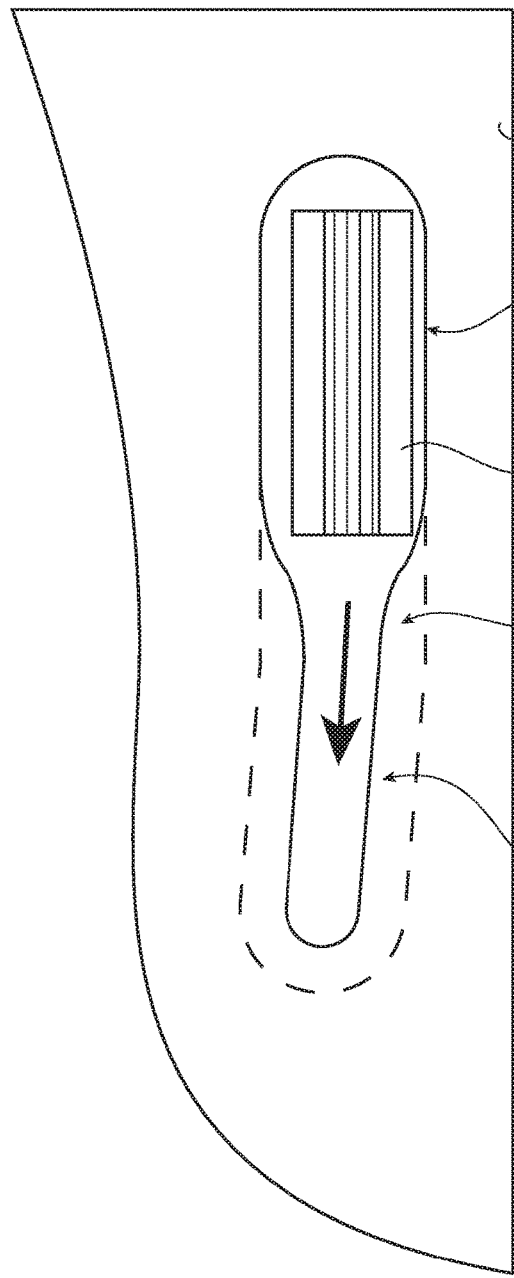
FIG. 14A shows a cross-section of the furniture joint.
Figure 14B:
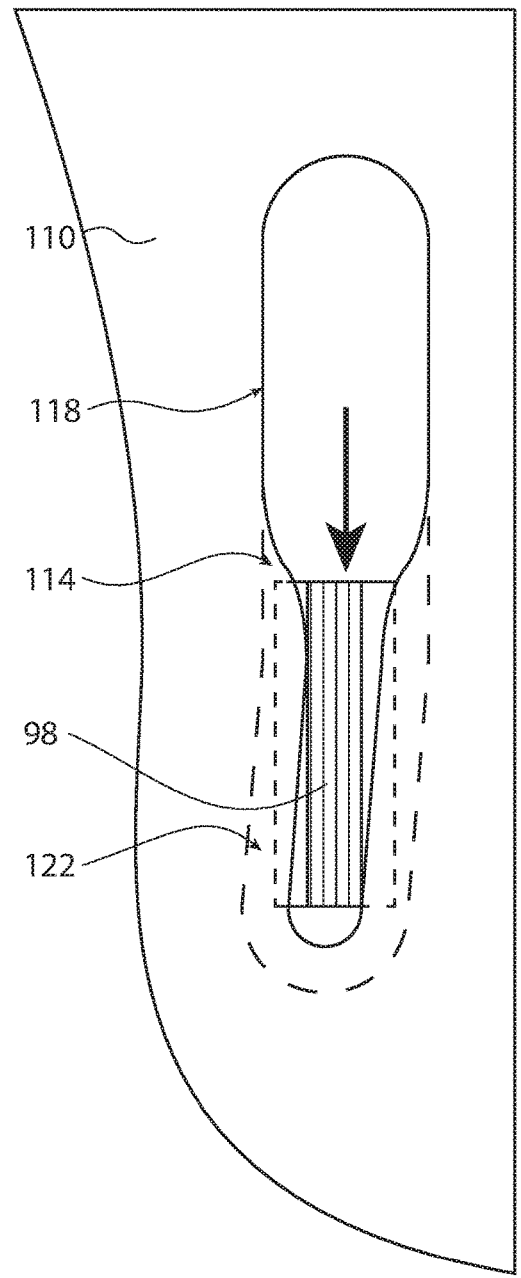
FIG. 14B shows a cross-section of the furniture joint.

FIG. 14A-14B show a variation of the slot 114, with a diagonal engagement portion 122 which forces the tab 98 outward away from the edge of the panel 110 when the tab 98 is moved to the engagement portion 122 of the slot 114. This slot design can be used to stretch the connector 94 so that the elastic bending/stretching of the connector 94 applies force to keep the joint together.

FIG. 15A-15B show a variation of the slot, with a slot whose neck gets narrower moving in the engagement portion 122 towards the end. This could allow the geometric connector body 94 to wedge down into the slot end and keep the connector 94 tight in the slot 114.

Figure 16A:
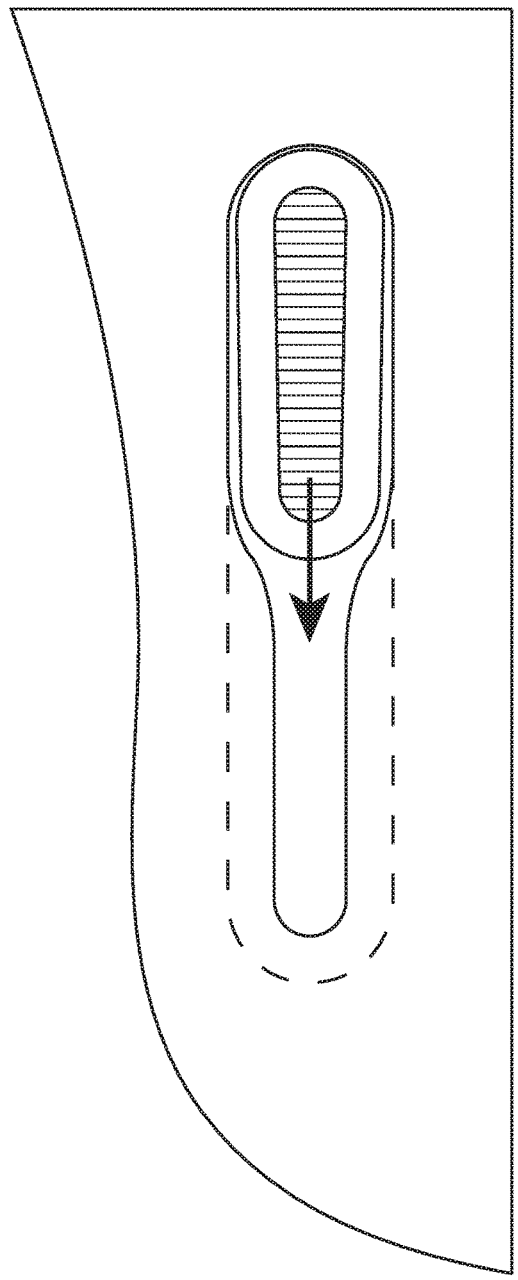
FIG. 16A shows a cross-section of the furniture joint.
Figure 16B:
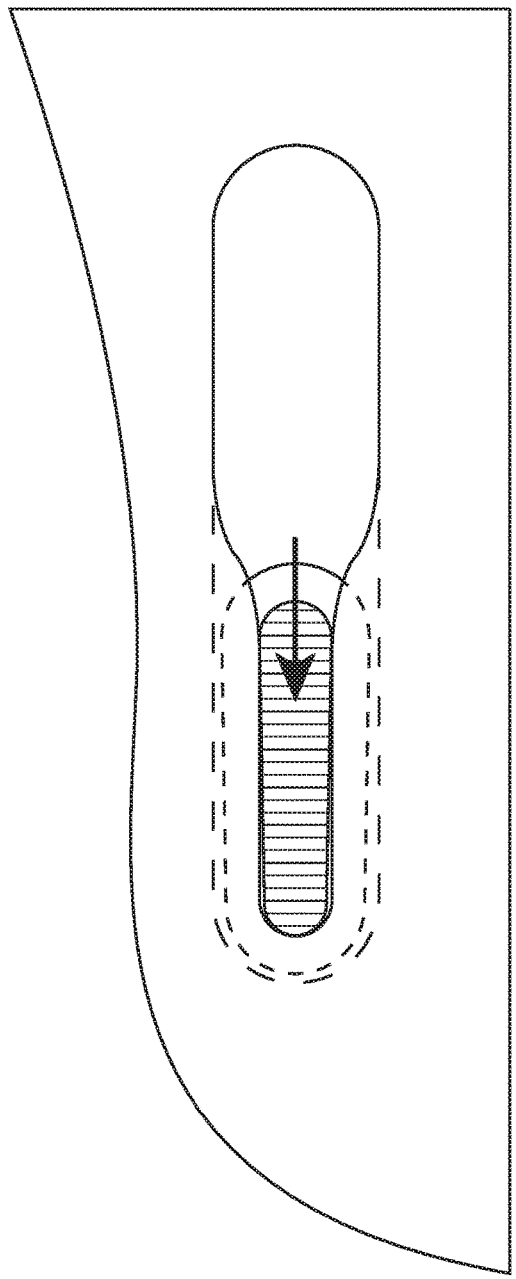
FIG. 16B shows a cross-section of the furniture joint.
Figure 17A:
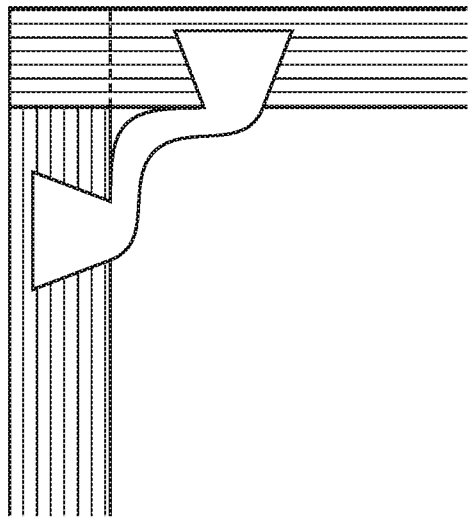
FIG. 17A shows a cross-section of the furniture joint.

FIG. 16A-16B show a variation of the geometric connector body, as if it were injection molded. If injection molded, the neck between the dovetail and the curved material could narrow towards the bottom, allowing the piece to wedge against the sides of the slot when fully pushed down, potentially preventing rattling. Alternatively the neck could be angled, or the head could be angled to tension the joint FIGS. 17A through 17D show cross sections through the engagement portion 122 of the slot 114. FIG. 17A shows how the two panels could come together with a box joint, preventing movement relative to each other.

Figure 17B:
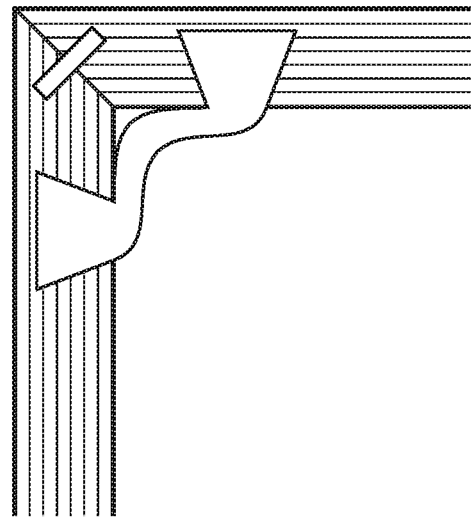
FIG. 17B shows a cross-section of the furniture joint.

FIG. 17B shows how the two panels could come together with a miter joint and a pin preventing movement relative to each other.

Figure 17C:
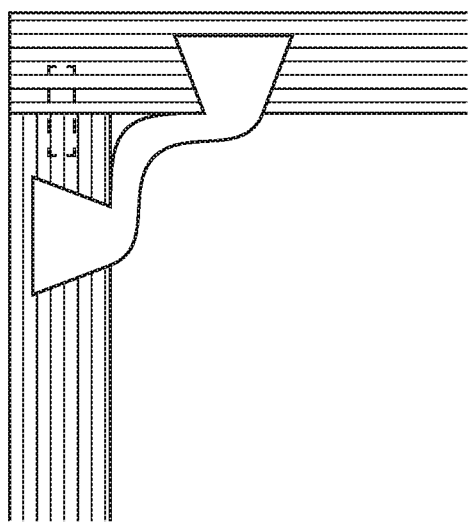
FIG. 17C shows a cross-section of the furniture joint.

FIG. 17C shows how the two panels could come together with a pin holding them in position relative to each other.

Figure 17D:
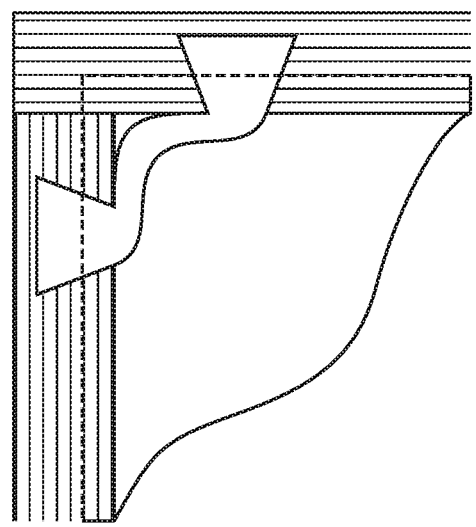
FIG. 17D shows a cross-section of the furniture joint.

FIG. 17D shows how the two panels could be held in position relative to each other with the help of a dado joint in the bottom or back piece.

The above description of illustrated examples of the present invention, including what is described in the Abstract, are not intended to be exhaustive or to be limitation to the precise forms disclosed. While specific examples of the invention are described herein for illustrative purposes, various equivalent modifications are possible without departing from the broader scope of the present claims. Indeed, it is appreciated that specific example dimensions, materials, etc., are provided for explanation purposes and that other values may also be employed in other examples in accordance with the teachings of the present invention.

What is claimed is:

1. A piece of furniture comprising:
a first panel;
a slot formed in the first panel, wherein the slot comprises an engagement portion which comprises a first sidewall which is perpendicular to a face of the first panel and a second sidewall comprising a first portion which is disposed at an acute angle relative to a face of the first panel such that the first portion extends between a wider part of the slot and a narrower part of the slot;
a second panel;
a tab formed adjacent a first edge of the second panel, wherein the tab comprises a first face which is planar with a face of the second panel and a second face opposite the first face comprising a first portion which is disposed at an acute angle relative to a face of the second panel; and
wherein the tab is disposed in the engagement portion of the slot, wherein the first face of the tab engages the first sidewall of the slot and wherein the first portion of the second face of the tab engages the first portion of the second slot sidewall such that the tab is held within the slot.

2. The piece of furniture of claim 1, wherein the second sidewall of the slot comprises:
a second portion connected to the first portion of the second slot sidewall and extending away from the first portion towards the second panel, wherein the second portion of the second slot sidewall is disposed at an angle relative to the first portion of the second slot sidewall;
and wherein the tab comprises:
a second portion of the second face of the tab which is disposed at an angle relative to the first portion of the second face of the tab and which engages the second portion of the second slot sidewall.

3. The piece of furniture of claim 2, wherein the second sidewall of the slot further comprises a third portion, wherein the third portion is disposed at an angle relative to the first portion of the second slot sidewall, and wherein the second face of the tab comprises a third surface which engages the third portion of the second slot sidewall.

4. The piece of furniture of claim 3, wherein the third portion is disposed at an angle relative to the face of the first panel so that the slot widens along the third portion in a direction towards the second panel.

5. A piece of modular furniture comprising:
a first rigid panel;
a slot formed in the first panel, wherein the slot comprises an engagement portion which comprises:
a first sidewall; and
a second sidewall defining a side of the slot opposite the first sidewall, the second sidewall comprising:
a first portion disposed away from the second panel, wherein the first portion of the sidewall is perpendicular to the face of the first panel; and
a second portion adjacent the first portion and extending from the first portion towards the second panel, wherein the second portion is disposed at an acute angle to the face of the first panel so that the slot narrows along the second portion in a direction towards the second panel;
a second rigid panel;
a tab formed adjacent a first edge of the second panel, wherein the tab comprises:
a first lateral face; and
a second lateral face which is opposite the first lateral face and which comprises:
a first surface which is parallel to the face of the second panel and which engages the first portion of the second slot sidewall; and
a second sloping surface which is disposed at an angle to the face of the second panel and which engages the second portion of the second slot sidewall.

6. The piece of modular furniture of claim 5, wherein the first sidewall of the slot is perpendicular to the face of the first panel.

7. The piece of furniture of claim 5, wherein the second sidewall of the slot further comprises a third portion adjacent the second portion and extending from the second portion towards the second panel, wherein the third portion is disposed at an angle relative to the second portion, and wherein the second lateral face of the tab comprises a third surface which engages the third portion of the second slot sidewall.

8. The piece of furniture of claim 7, wherein the third portion is disposed at an angle relative to the face of the first panel so that the slot widens along the third portion in a direction towards the second panel.

9. A piece of modular furniture comprising:
a first rigid panel;
a slot formed in the first panel, wherein the slot comprises an engagement portion which comprises:
a first sidewall; and
a second sidewall defining a side of the slot opposite the first sidewall, the second sidewall comprising a first portion which is angled relative to a face of the first panel such that the first portion extends between a wider part of the slot and a narrower part of the slot and a second portion attached to the first portion at an angle;
a second rigid panel;
a tab formed adjacent a first edge of the second panel, wherein the tab comprises:
a first lateral face; and
a second lateral face which is opposite the first lateral face and which comprises a first surface which is parallel to the first portion of the second slot sidewall and which engages the first portion of the second slot sidewall and a second surface which is parallel to the second portion of the second slot sidewall and which engages the second portion of the second slot sidewall.

10. The piece of modular furniture of claim 9, wherein the second portion of the second slot sidewall is perpendicular to the face of the first panel.

11. The piece of modular furniture of claim 9, wherein the first portion of the second slot sidewall is disposed at an acute angle relative to the face of the first panel and wherein the second portion of the second slot sidewall is disposed at an obtuse angle relative to the face of the first panel.

12. The piece of modular furniture of claim 9, wherein the second portion of the second slot sidewall extends outwardly from the first portion of the second slot sidewall and wherein an inward most portion of the second slot sidewall is disposed within the thickness of the first panel separated from a face of the first panel by a distance.

13. The piece of modular furniture of claim 9, wherein the first portion of the second slot sidewall and the second portion of the second slot sidewall are generally flat and wherein the first portion of the second slot sidewall and the second portion of the second slot sidewall are connected to each other by a curved section of the second slot sidewall.

14. A piece of modular furniture comprising:
a first panel;
a slot formed in the first panel, wherein the slot comprises an engagement portion which comprises:
a first sidewall; and
a second sidewall defining a side of the slot opposite the first sidewall, the second sidewall comprising a first portion which is angled relative to a face of the first panel such that the first portion extends between a wider part of the slot and a narrower part of the slot and a second portion which is attached to the first portion and is angled relative to the first portion;
a second panel;
a tab formed adjacent a first edge of the second panel, wherein the tab comprises:
a first lateral face; and
a second lateral face which is opposite the first lateral face and which comprises a shaped face which engages the second sidewall of the slot to secure the tab within the engagement portion of the slot.

15. The piece of modular furniture of claim 14, wherein the second lateral face of the tab more specifically comprises a first surface which is parallel to the first portion of the second slot sidewall and which engages the first portion of the second slot sidewall and a second surface.

16. The piece of modular furniture of claim 14, wherein the first portion of the second slot sidewall is generally planar.

17. The piece of modular furniture of claim 14, wherein the first portion of the second slot sidewall and the second portion of the second slot sidewall are connected to each other by a curved section of the slot sidewall.

18. The piece of modular furniture of claim 14, wherein the second portion of the second slot sidewall is disposed between the first portion of the second slot sidewall and an opening of the slot disposed adjacent the first edge of the second panel.

19. The piece of modular furniture of claim 18, wherein the second portion of the second slot sidewall is angled relative to a face of the first panel in a direction opposite that of the first portion of the second slot sidewall.

20. The piece of modular furniture of claim 18, wherein an inward most portion of the second slot sidewall is located within the thickness of the first panel separated from a face of the first panel by a distance.

21. The piece of modular furniture of claim 14, wherein the second portion of the second slot sidewall is generally perpendicular to the face of the first panel.

22. The piece of modular furniture of claim 14, wherein the first portion of the second slot sidewall is disposed at an acute angle relative to the face of the first panel and wherein the second portion of the second slot sidewall is disposed at an obtuse angle relative to the face of the first panel.

23. The piece of modular furniture of claim 14, wherein the second slot sidewall further comprises a third section which is disposed at an angle relative to the first section of the second slot sidewall.

24. The piece of modular furniture of claim 23, wherein the third section of the second slot sidewall is generally flat and generally perpendicular to the face of the first panel.

* * * * *